(12) United States Patent
Kitamura et al.

(10) Patent No.: US 10,387,019 B2
(45) Date of Patent: Aug. 20, 2019

(54) USER INTERFACE DEVICE AND METHOD FOR DISPLAYING USER INTERFACE

(71) Applicant: Mitsubishi Electric Corporation, Chiyoda-ku (JP)

(72) Inventors: Yoshiaki Kitamura, Tokyo (JP); Kohei Tanaka, Tokyo (JP); Mitsuo Shimotani, Tokyo (JP); Yukio Goto, Tokyo (JP); Akira Toyooka, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/546,538

(22) PCT Filed: Jan. 21, 2016

(86) PCT No.: PCT/JP2016/051718
§ 371 (c)(1),
(2) Date: Jul. 26, 2017

(87) PCT Pub. No.: WO2016/121620
PCT Pub. Date: Aug. 4, 2016

(65) Prior Publication Data
US 2018/0004403 A1    Jan. 4, 2018

(30) Foreign Application Priority Data

Jan. 27, 2015    (JP) ................................. 2015-012965

(51) Int. Cl.
*G06F 3/0484*    (2013.01)
*G06F 3/14*    (2006.01)
(Continued)

(52) U.S. Cl.
CPC .......... *G06F 3/04845* (2013.01); *G06F 3/048* (2013.01); *G06F 3/0486* (2013.01); *G06F 3/14* (2013.01); *G06F 9/451* (2018.02)

(58) Field of Classification Search
CPC ...... G06F 3/04845; G06F 9/451; G06F 3/048; G06F 3/0486; G06F 3/14
See application file for complete search history.

(56) References Cited

U.S. PATENT DOCUMENTS 7,113,973 B2    9/2006 Yoshii et al.
8,209,626 B2    6/2012 Yokoyama
(Continued)

FOREIGN PATENT DOCUMENTS

JP    2004-86551 A    3/2004
JP    2006-350490 A    12/2006
(Continued)

OTHER PUBLICATIONS

International Preliminary Report on Patentability and Written Opinion dated Aug. 10, 2017 in PCT/JP2016/051718 (with English language translation).
(Continued)

*Primary Examiner* — Andrew Sasinowski
(74) *Attorney, Agent, or Firm* — Oblon, McClelland, Maier & Neustadt, L.L.P.

(57) ABSTRACT

This relates to a technology capable of efficiently deciding a screen layer to which a user input event should be delivered even when screen layers that do not receive the user input event are displayed in an overlapping manner other than a screen layer that should receive the user input event. A user interface device includes an acquisition unit, a transmission unit, a determination unit, and a decision unit. On the basis of inquiry information from the transmission unit, the determination unit concurrently determines, for a plurality of screen layers, whether input information is accepted in each of the screen layers. The decision unit decides the screen layer based on a determination result.

12 Claims, 24 Drawing Sheets

(51) Int. Cl.
*G06F 3/0486* (2013.01)
*G06F 3/048* (2013.01)
*G06F 9/451* (2018.01)

(56) References Cited

U.S. PATENT DOCUMENTS

| | | | | |
|---|---|---|---|---|
| 8,209,628 | B1* | 6/2012 | Davidson | G06F 3/0487 |
| | | | | 715/790 |
| 8,285,499 | B2 | 10/2012 | Moore et al. | |
| 2009/0306885 | A1* | 12/2009 | Yokoyama | G09B 29/106 |
| | | | | 701/532 |
| 2015/0268804 | A1* | 9/2015 | Hwang | G06F 3/0485 |
| | | | | 715/719 |

FOREIGN PATENT DOCUMENTS

| | | | |
|---|---|---|---|
| JP | 4522533 B2 | 8/2010 | |
| JP | 4856756 B2 | 1/2012 | |
| JP | 2012-242962 A | 12/2012 | |
| JP | 2014-211889 A | 11/2014 | |

OTHER PUBLICATIONS

International Search Report dated Apr. 12, 2016 in PCT/JP2016/051718 filed Jan. 21, 2016.

* cited by examiner

F I G. 3
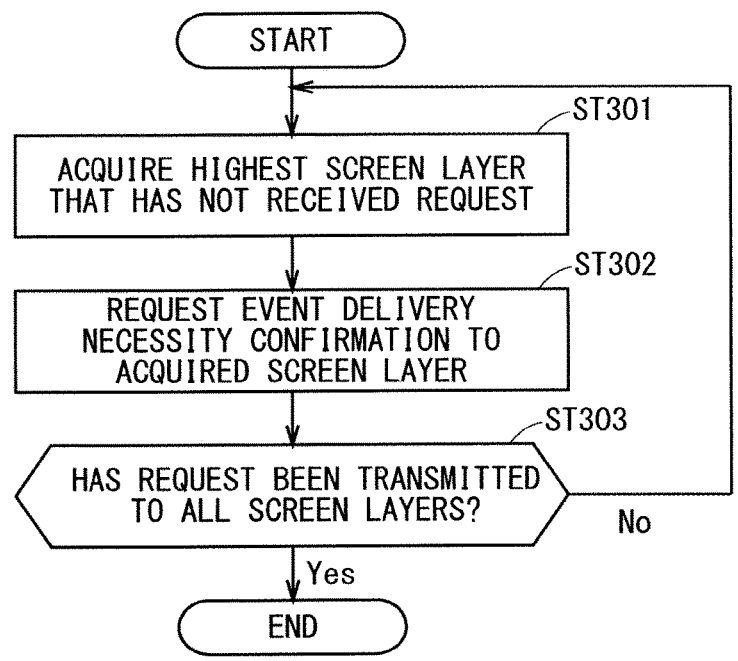
F I G. 4
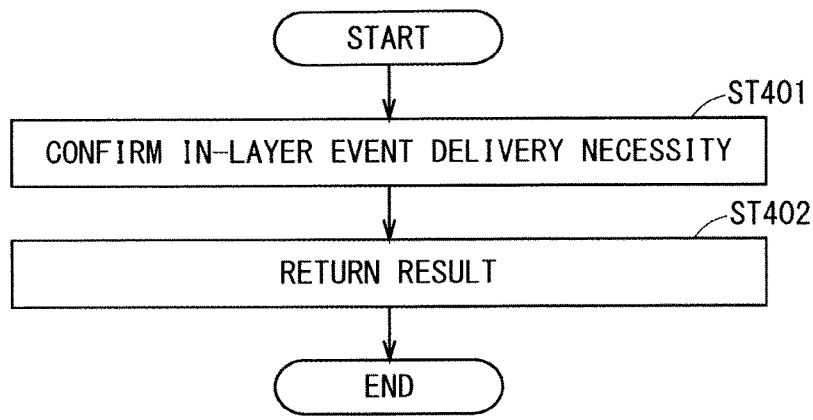

F I G. 8
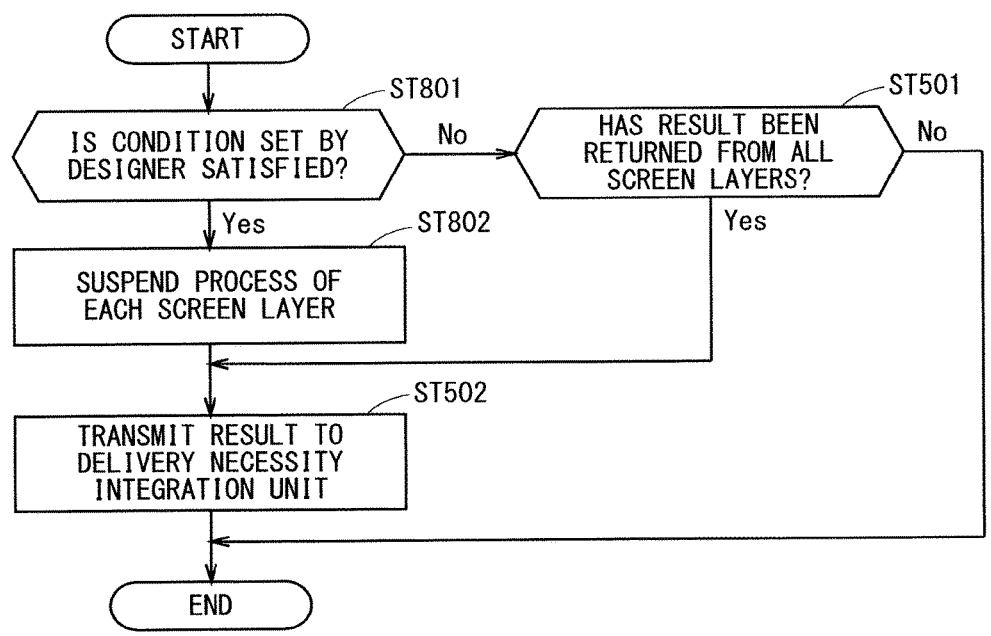

F I G. 1 4
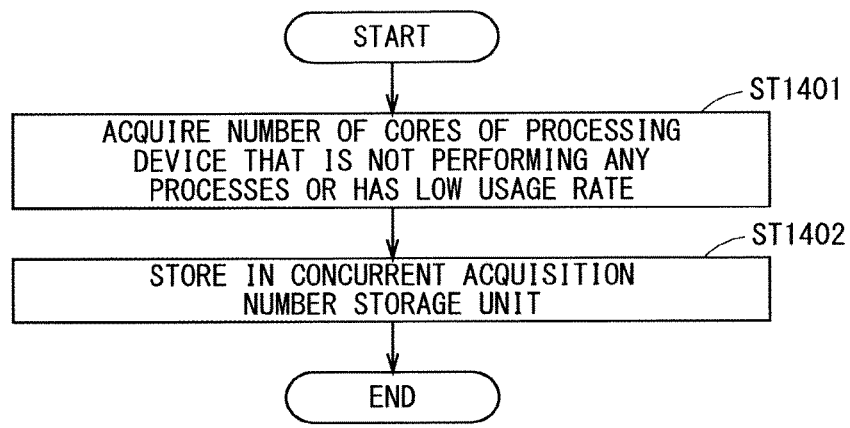

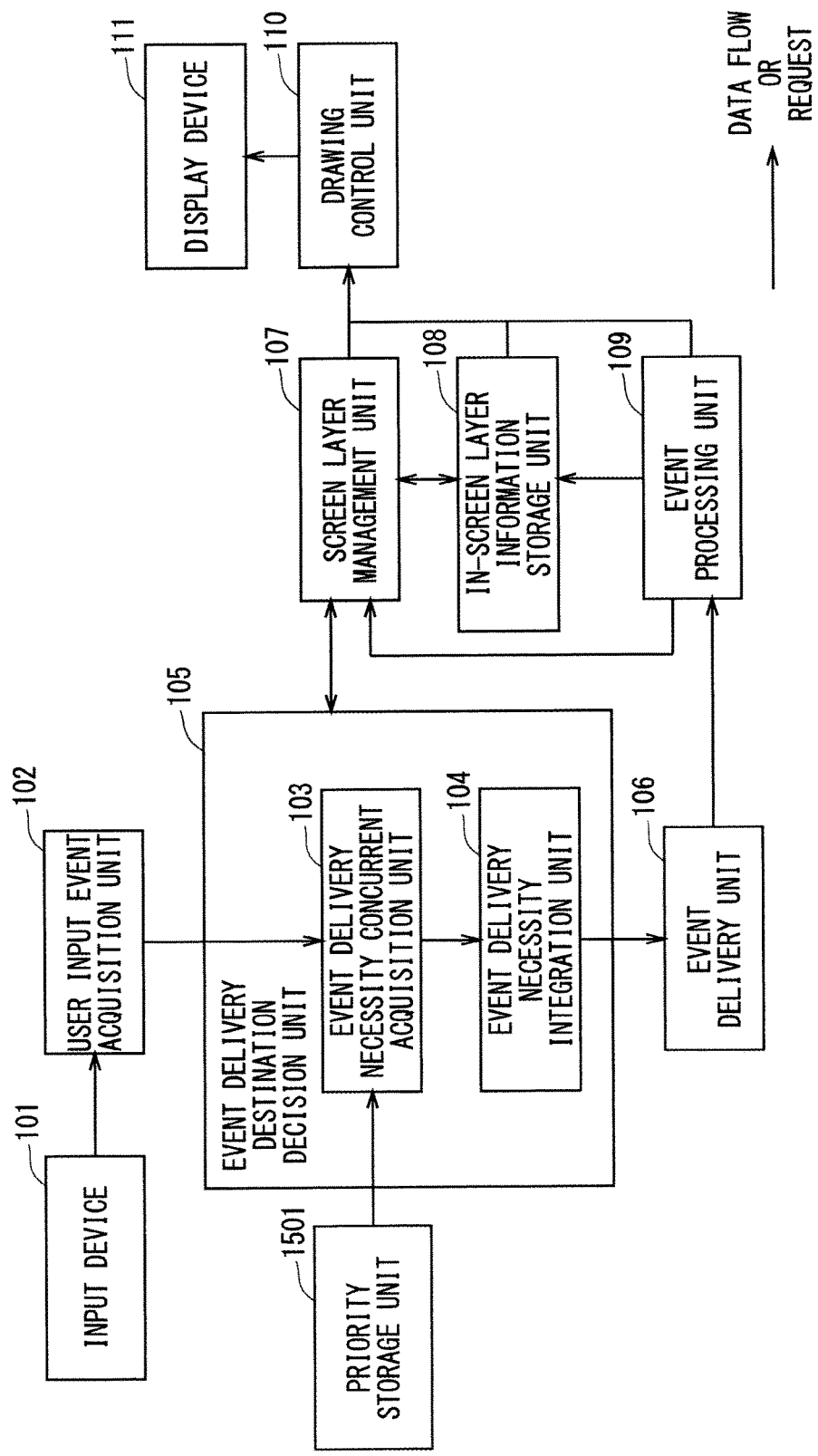

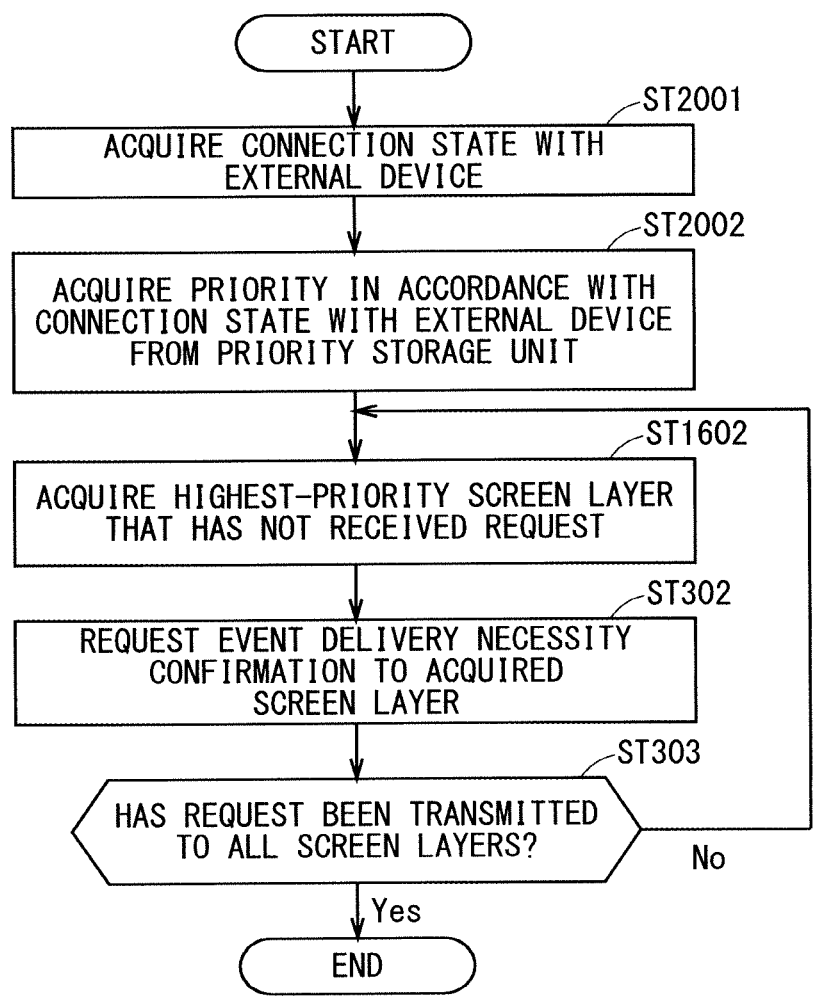
F I G. 2 0

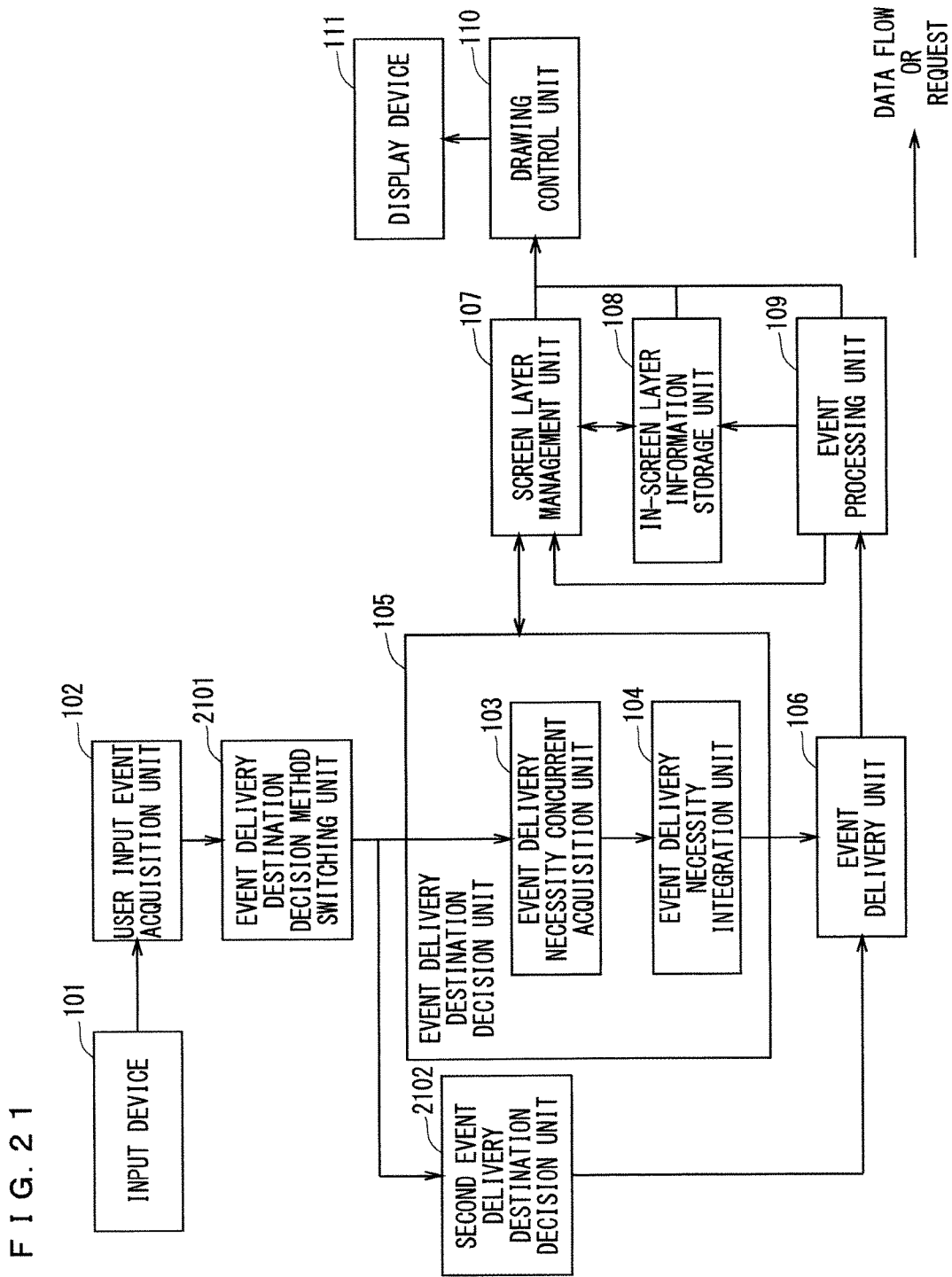

F I G. 2 2
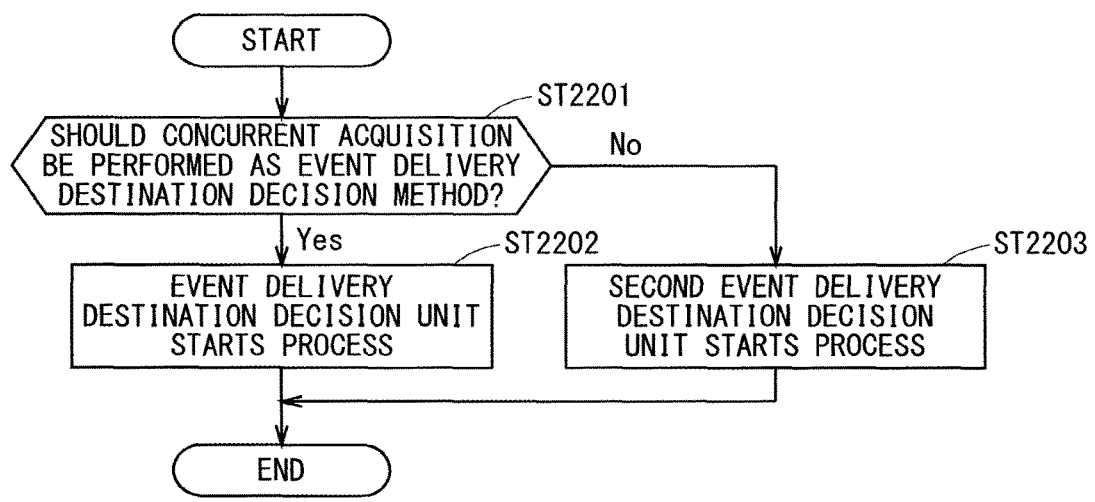
F I G. 2 3
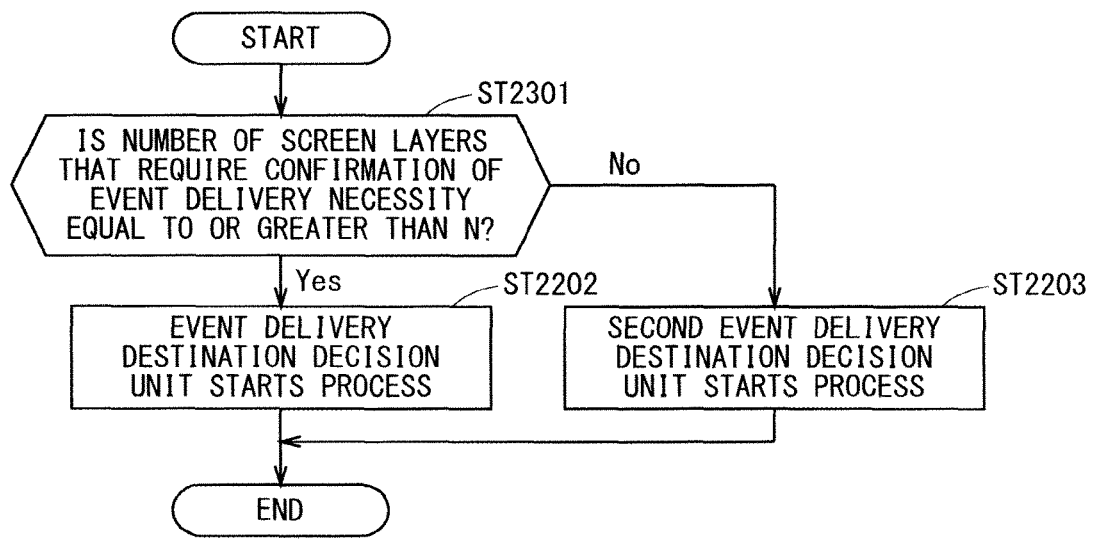

F I G. 2 6
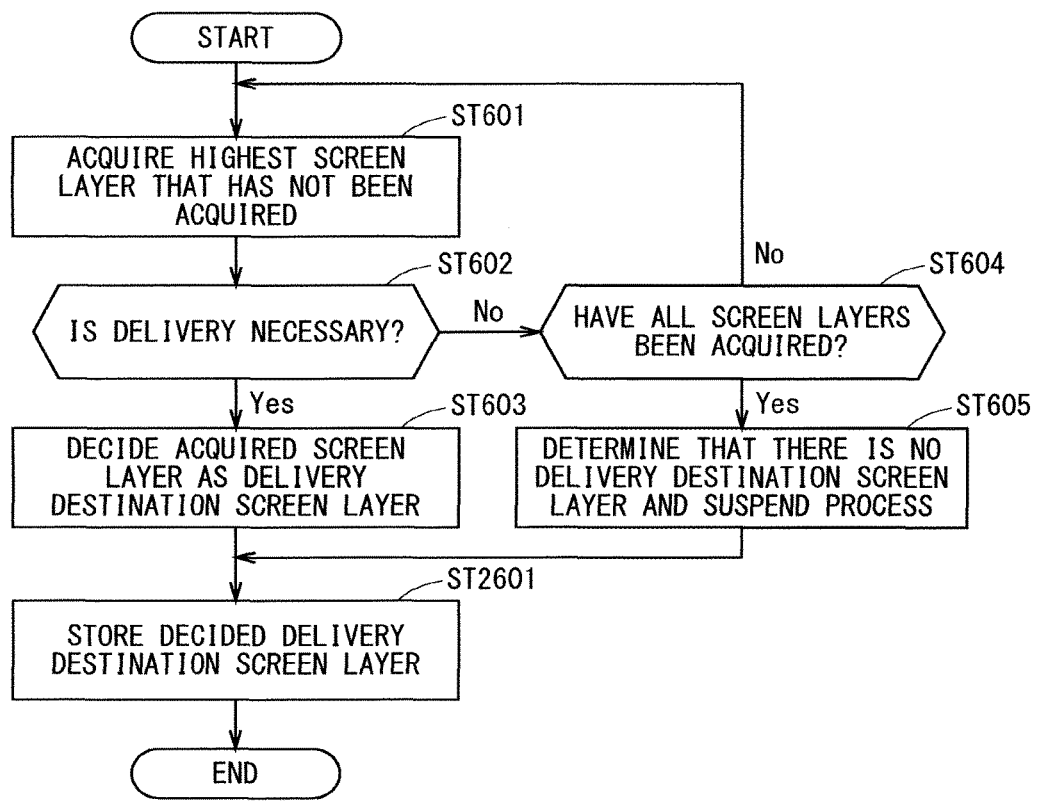

USER INTERFACE DEVICE AND METHOD FOR DISPLAYING USER INTERFACE

TECHNICAL FIELD

The present technology relates to a user interface device that displays a screen including a plurality of screen layers.

BACKGROUND ART

As a user interface of an information device, devices exist that display screens including a plurality of screen layers. Each screen layer retains information representing transmittance called an alpha value for a region on the screen layer. By displaying each screen layer in a superimposed manner on the basis of the alpha value, it is possible to display a lower screen layer only in a specified region, and when screen layers overlap each other, it is possible to perform display such that translucent images overlap each other.

In such a device, there is a possibility that a user selects a specific object by clicking a mouse, tapping a touch panel, or the like on a screen on which a plurality of screen layers are displayed. At this time, an event indicating that there has been input from the user is generally sent only to a foremost screen layer. However, since the object the user is trying to select is not necessarily displayed on the foremost screen layer, there arises a problem that the user cannot immediately select the object the user wants to select.

As a method for solving this problem, for example, in Patent Document 1, a method is disclosed for setting a threshold for each screen layer, receiving a user input event when the alpha value at coordinates at which to receive the input from the user exceeds the threshold, and delivering the user input event to a lower screen layer again when the alpha value at the coordinates is less than the threshold.

In addition, for example, in Patent Document 2, a method is disclosed under which priority of each screen layer is set in advance for a type of user input event, and a delivery destination of the user input event is decided in accordance with the type of the user input event and the priority.

PRIOR ART DOCUMENTS

Patent Documents

Patent Document 1: Japanese Patent No. 4856756
Patent Document 2: Japanese Patent No. 4522533

SUMMARY OF INVENTION

Problems to be Solved by the Invention

However, for example, under the method for deciding the delivery destination of the user input event disclosed in Patent Document 1, when many screen layers that do not receive the user input event are displayed, in an overlapping manner, higher than the screen layer that should receive the user input event, it is necessary to sequentially search each of the higher screen layers. Display content displayed on respective screen layers is often drawn by different processes, and when the higher screen layers are sequentially searched, communication between the screen layers occurs in large quantity. As a result, there is a problem that it takes time until the user input event is executed.

In addition, for example, under the method for deciding the delivery destination of the user input event disclosed in Patent Document 2, when a region that receives the user input event and a region that does not receive the user input event are mixed within one screen layer, intended operations cannot be performed in some cases. In order to correctly operate at a high speed even in such a case, it is necessary to retain in advance. in a table or the like, priority of each region in the screen layer. However, when there is a change in a position, shape, or the like of an object that is displayed on the screen layer and receives the user input event, and furthermore, when there is a change in a position, shape, or the like of the screen layer itself, it is necessary to change this table accordingly. Therefore, when there is a frequent change in the position or shape of the object, or furthermore, in the position or shape of the screen layer, or when there is a continuous change therein like an animation, there is a possibility that it takes time to update the above table and that the change in the position or shape is not displayed smoothly. In addition, since it is necessary to separately have a table for setting the priority in accordance with the type of user input event, a large amount of storage area for storing the table is also required.

The present technology solves the foregoing problems, and relates to a user interface device, a method for displaying a user interface, and a control program capable of efficiently deciding the screen layer to which the user input event should be delivered, even when the screen layers that do not receive the user input event are displayed in an overlapping manner other than the screen layer that should receive the user input event.

Means for Solving the Problems

A user interface device according to one aspect of the present technology is a user interface device capable of superimposing at least part of a plurality of screen layers for display on a screen, the user interface device including: an acquisition unit that acquires input information from outside; a transmission unit that transmits inquiry information inquiring whether the input information is accepted in each of the screen layers; a determination unit that concurrently determines whether the input information is information that is accepted in each of the screen layers for at least two of the screen layers of the plurality of screen layers based on the inquiry information; and a decision unit that decides at least one of the screen layers in which the input information is accepted based on a determination result in the determination unit.

A method for displaying a user interface according to one aspect of the present technology is a method for displaying a user interface for superimposing at least part of a plurality of screen layers for display on a screen, the method including: transmitting inquiry information inquiring whether input information from outside is accepted in each of the screen layers; determining concurrently whether the input information is information that is accepted in each of the screen layers for at least two of the screen layers of the plurality of screen layers based on the inquiry information; and deciding at least one of the screen layers in which the input information is accepted based on a result of the determination.

A control program according to one aspect of the present technology is a control program for controlling a user interface device capable of superimposing at least part of a plurality of screen layers for display on a screen, the control program configured to cause the user interface device to: transmit inquiry information inquiring whether input information from outside is accepted in each of the screen layers; determine concurrently whether the input information is information that is accepted in each of the screen layers for at least two of the screen layers of the plurality of screen layers based on the inquiry information; and decide at least one of the screen layers in which the input information is accepted based on a result of the determination.

Effects of the Invention

The user interface device according to one aspect of the present technology is a user interface device capable of superimposing at least part of a plurality of screen layers for display on a screen. The user interface device includes: an acquisition unit that acquires input information from outside; a transmission unit that transmits inquiry information inquiring whether the input information is accepted in each of the screen layers; a determination unit that concurrently determines whether the input information is information that is accepted in each of the screen layers for at least two of the screen layers of the plurality of screen layers based on the inquiry information; and a decision unit that decides at least one of the screen layers in which the input information is accepted based on a determination result in the determination unit.

With such a configuration, even when the screen layers that do not receive the user input event are displayed in an overlapping manner other than the screen layer that should receive the user input event, the screen layer to which the user input event should be delivered can be decided efficiently.

The method for displaying a user interface according to one aspect of the present technology is a method for displaying a user interface for superimposing at least part of a plurality of screen layers for display on a screen. The method for displaying a user interface includes: transmitting inquiry information inquiring whether input information from outside is accepted in each of the screen layers; determining concurrently whether the input information is information that is accepted in each of the screen layers for at least two of the screen layers of the plurality of screen layers based on the inquiry information; and deciding at least one of the screen layers in which the input information is accepted based on a result of the determination.

With such a configuration, even when the screen layers that do not receive the user input event are displayed in an overlapping manner other than the screen layer that should receive the user input event, the screen layer to which the user input event should be delivered can be decided efficiently.

The control program according to one aspect of the present technology is a control program for controlling a user interface device capable of superimposing at least part of a plurality of screen layers for display on a screen, the control program configured to cause the user interface device to: transmit inquiry information inquiring whether input information from outside is accepted in each of the screen layers; determine concurrently whether the input information is information that is accepted in each of the screen layers for at least two of the screen layers of the plurality of screen layers based on the inquiry information; and decide at least one of the screen layers in which the input information is accepted based on a result of the determination.

With such a configuration, even when the screen layers that do not receive the user input event are displayed in an overlapping manner other than the screen layer that should receive the user input event, the screen layer to which the user input event should be delivered can be decided efficiently.

Objects, features, aspects, and advantages of the present technology will become more apparent in the following detailed descriptions and the accompanying drawings.

BRIEF DESCRIPTION OF DRAWINGS

FIG. 3 is a flowchart illustrating a process flow of a confirmation request of event delivery necessity to each screen layer in an event delivery necessity concurrent acquisition unit.

FIG. 4 is a flowchart illustrating a confirmation process flow of event delivery necessity to be performed for each screen layer.

FIG. 8 is a flowchart illustrating a process flow in a case of transmitting a confirmation result of event delivery necessity even when one or more screen layers do not return the confirmation result of event delivery necessity.

FIG. 14 is a flowchart illustrating a process for acquiring the number of cores of the processing device that is not performing any processes or has a low usage rate, and storing the number of cores in the concurrent acquisition number storage unit.

FIG. 15 is a diagram conceptually illustrating the configuration of the user interface device according to the embodiment.

FIG. 20 is a flowchart illustrating the confirmation request process flow of event delivery necessity in a case where priority in accordance with a connection state with an external device is stored in the priority storage unit.

FIG. 21 is a diagram conceptually illustrating the configuration of the user interface device according to the embodiment.

FIG. 22 is a flowchart illustrating a process flow of an event delivery destination decision method switching unit.

FIG. 23 is a flowchart illustrating a process flow in a case where an event delivery destination decision method is switched in accordance with the number of screen layers that require confirmation of event delivery necessity.

FIG. 26 is a flowchart illustrating a process flow of the event delivery necessity integration unit when drag starts.

DESCRIPTION OF EMBODIMENTS

Figure 1:
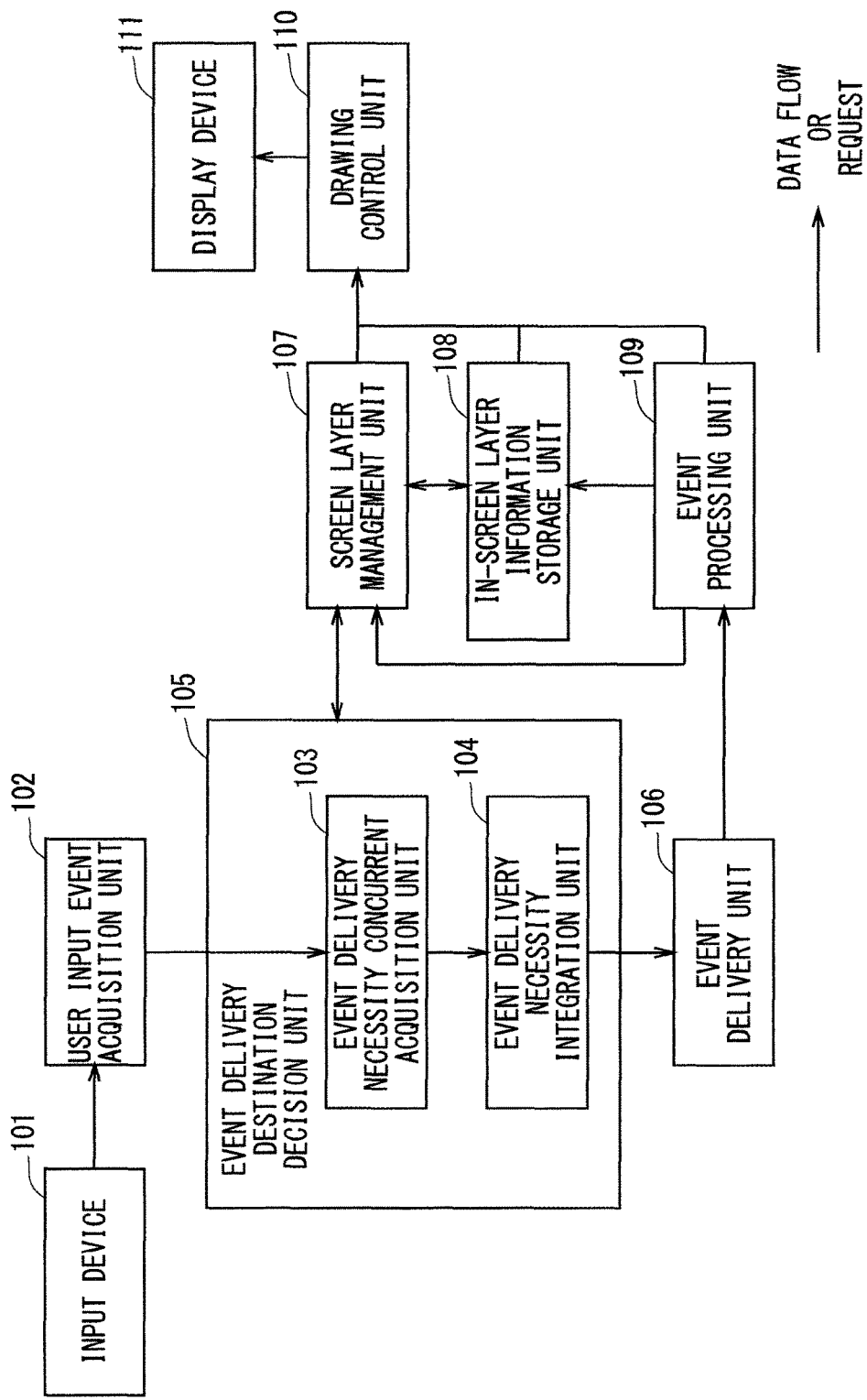
FIG. 1 is a diagram conceptually illustrating a configuration of a user interface device according to an embodiment.

Embodiments will be described below with reference to the accompanying drawings. It should be noted that the drawings are illustrated schematically, and correlation of sizes and positions of images illustrated in the different drawings is not necessarily described accurately and can be changed as appropriate. In addition, in the following descriptions, similar components are denoted with the same reference numerals, and their names and functions are also denoted similarly. Therefore, detailed descriptions thereof may be omitted.

Furthermore, in the following descriptions, although terms meaning specific positions and directions such as "above" or "below" are used in some cases, these terms are used for convenience to facilitate understanding of details of the embodiments and are not related to directions at the time of actual implementation.

<First Embodiment>
<Configuration>

Figure 29:
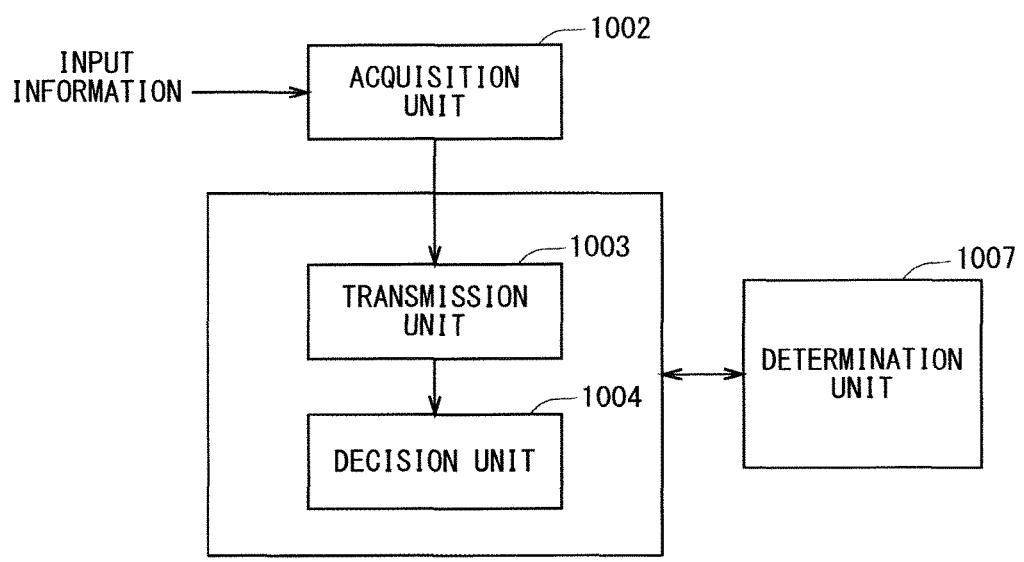
FIG. 29 is a diagram conceptually illustrating the configuration of the user interface device according to the embodiment.

FIG. 29 is a diagram conceptually illustrating a configuration of a user interface (hereinafter also referred to as UI) device according to the present embodiment.

The user interface device illustrated in FIG. 29 is a user interface device capable of superimposing at least part of a plurality of screen layers for display on a screen. Also, the user interface device includes an acquisition unit 1002, a transmission unit 1003, a determination unit 1007, and a decision unit 1004.

The acquisition unit 1002 is a functional unit that acquires input information from outside. The transmission unit 1003 is a functional unit that transmits inquiry information inquiring whether the input information is accepted in each screen layer. The determination unit 1007 is a functional unit that determines concurrently whether the input information is information that is accepted in each screen layer, for at least two screen layers of the plurality of screen layers on the basis of the inquiry information. The decision unit 1004 is a functional unit that decides at least one screen layer in which the input information is accepted on the basis of a determination result in the determination unit 1007.

FIG. 1 is a diagram illustrating more specifically the configuration of the above-described user interface (hereinafter also referred to as UI) device according to the present embodiment.

The user interface device illustrated in FIG. 1 includes an input device 101, a user input event acquisition unit 102, an event delivery necessity concurrent acquisition unit 103, an event delivery necessity integration unit 104, an event delivery destination decision unit 105, an event delivery unit 106, a screen layer management unit 107, an in-screen layer information storage unit 108, an event processing unit 109, a drawing control unit 110, and a display device 111.

The acquisition unit 1002 illustrated in FIG. 29 corresponds to the user input event acquisition unit 102 illustrated in FIG. 1. The transmission unit 1003 illustrated in FIG. 29 corresponds to the event delivery necessity concurrent acquisition unit 103 illustrated in FIG. 1. The determination unit 1007 illustrated in FIG. 29 corresponds to the screen layer management unit 107 illustrated in FIG. 1. The decision unit 1004 illustrated in FIG. 29 corresponds to the event delivery necessity integration unit 104 illustrated in FIG. 1.

The input device 101 is a device for a user to perform operations on user interfaces displayed on the display device 111. Specifically, the input device 101 is a device including a pointing device such as a mouse, a touch panel, a trackball, a data glove or a stylus, such as a keyboard or a voice input device or a microphone, or an image or video input device such as a camera, or an input device using an electroencephalogram, or sensors such as a motion sensor.

In the user input event acquisition unit 102, a user input event corresponding to the operation performed in the input device 101 is acquired. Here, the user input event includes all types of operations in the input device 101. Examples of the user input event include movement of a cursor with a mouse, start of click of a right button or a left button of a mouse, end of click of a right button or a left button of a mouse, double click of a mouse, drag of a mouse, wheel operation of a mouse, approach of a pointer to a specified display element with movement of a mouse, movement of a pointer onto a specified display element with movement of a mouse, movement of a pointer out of a specified display element with movement of a mouse, touch on a touch panel, tap on a touch panel, double tap on a touch panel, hold on a touch panel, flick on a touch panel, swipe on a touch panel, pinch in on a touch panel, pinch out on a touch panel, rotate on a touch panel, approach of a finger or the like to a touch panel surface, gesture operations using one or more fingers, depression of a key with a keyboard, release of a key with a keyboard, and simultaneous operations of a plurality of keys with a keyboard. In addition, a unique or new user input event may be defined by a combination of time, speed, acceleration, and a plurality of users, or a combination of a plurality of input devices, or the like. Note that these user input events are one example, and all other operations caused by intention or intent of the user are defined as user input events.

The event delivery necessity concurrent acquisition unit 103 acquires a determination result (event delivery necessity) performed concurrently on each screen layer about whether the user input event acquired by the user input event acquisition unit 102 is required. Specifically, the event delivery necessity concurrent acquisition unit 103 transmits information on the user input event to the screen layer management unit 107. Here, the information on the user input event is information on a type, input position, input time, input speed, or the like of the above-described user input event. However, since it is also assumed that event delivery necessity is defined as the entire screen layer without using coordinate information, numerical values such as coordinate information or character strings do not need to be included in the information on the user input event. Then, the screen layer management unit 107 concurrently collates information on each screen layer managed by the screen layer management unit 107 with the received information on the user input event, and transmits, to the event delivery necessity concurrent acquisition unit 103, information as to whether the user input event is required by each screen layer (whether input of the event is accepted) as event delivery necessity.

The event delivery necessity integration unit 104 integrates the event delivery necessity of each screen layer acquired by the event delivery necessity concurrent acquisition unit 103, and decides the screen layer to which the user input event should be delivered. The event delivery destination decision unit 105 is implemented through combination of the event delivery necessity concurrent acquisition unit 103 with the event delivery necessity integration unit 104.

The event delivery unit 106 delivers the user input event to the screen layer decided by the event delivery necessity integration unit 104.

The screen layer management unit 107 manages a superimposing relationship of each screen layer and the like. In addition, the screen layer management unit 107 manages information on each screen layer including information on whether each screen layer can accept the user input event.

The in-screen layer information storage unit 108 stores information such as a position or shape of the screen layer, an object that is being displayed, or a region to receive the user input event.

The event processing unit 109 processes the user input event delivered by the event delivery unit 106 in the target screen layer. Depending on a processing result, contents of the screen layer management unit 107 or the in-screen layer information storage unit 108 are updated.

The drawing control unit 110 draws a screen to be displayed on the display device 111 on the basis of the processing result of the event processing unit 109, contents of the screen layer management unit 107, and contents of the in-screen layer information storage unit 108. The display device 111 is a device for outputting the screen drawn by the drawing control unit 110, such as a display or a touch panel.

Figure 2:
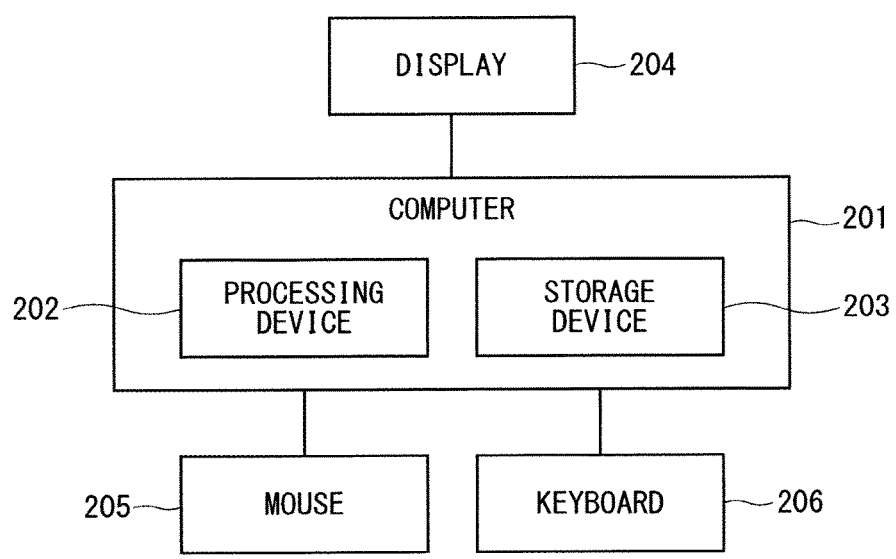
FIG. 2 is a diagram illustrating one example of a hardware configuration that implements the user interface device according to the embodiment.

FIG. 2 is a diagram illustrating one example of a hardware configuration that implements the above-described UI device.

The in-screen layer information storage unit 108 is implemented by, for example, a storage device 203 such as a RAM or a hard disk in a computer 201, but may be implemented by an external storage medium.

In addition, the user input event acquisition unit 102, the event delivery necessity concurrent acquisition unit 103 and the event delivery necessity integration unit 104 contained in the event delivery destination decision unit 105, the event delivery unit 106, the screen layer management unit 107, the event processing unit 109, and the drawing control unit 110 are implemented, for example, by a processing device 202 executing a program in the computer 201. The processing device 202 may be a case where a plurality of cores that actually execute processing is contained. A mouse 205, a keyboard 206, or the like corresponds to the input device 101. A display 204 or the like corresponds to the display device 111. Note that a touch panel or the like capable of performing both input and output can correspond to a hardware configuration of the input device 101 and the display device 111. In that case, the hardware configurations of the input device 101 and the display device 111 may be implemented by an identical device.

<Operation>

Figure 7A:
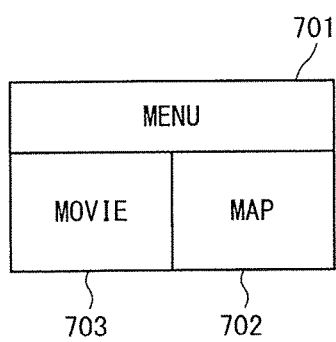
FIGS. 7A and 7B are diagrams each illustrating one example of a screen on which a plurality of screen layers are superimposed.
Figure 7B:
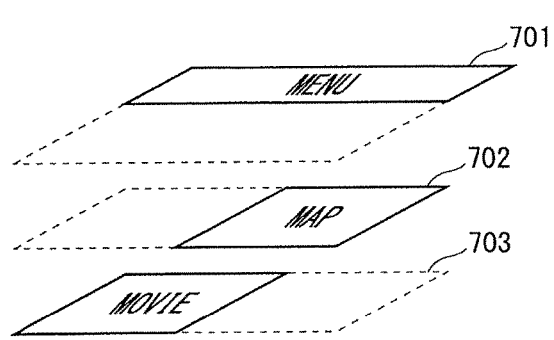

FIGS. 7A and 7B are each one example of a screen on which a plurality of screen layers are superimposed. FIG. 7A illustrates a screen to be displayed on the display device 111. In addition, FIG. 7B illustrates layer structure of the screen layers of the screen to be displayed in FIG. 7A.

As illustrated in FIG. 7B, the screen illustrated in FIG. 7A is displayed by a screen layer 703, a screen layer 702, and a screen layer 701 being superimposed in order from the bottom to constitute one screen.

In FIG. 7B, the screen layer 701 is referred to as a highest screen layer. The screen layer 703 is referred to as a lowest screen layer. Furthermore, like the screen layer 701 viewed from the screen layer 702, the screen layer by which the layer itself (that is, the screen layer 702) is hidden when overlapping is referred to as a higher screen layer, whereas like the screen layer 703, the screen layer that allows the layer itself (that is, the screen layer 702) to be displayed when overlapping is referred to as a lower screen layer.

The following describes an operation flow in the user interface device that displays such a screen from user operation input to decision of a delivery destination screen layer of the user input event.

First, the user performs some operation in the input device 101. Details of the operation are acquired by the user input event acquisition unit 102 as a user input event.

Next, for each screen layer that is currently displayed on the display device 111, delivery necessity of the user input event acquired by the user input event acquisition unit 102 is determined concurrently, and is acquired as event delivery necessity.

FIG. 3 is a flowchart illustrating a process flow of a confirmation request of event delivery necessity for each screen layer in the event delivery necessity concurrent acquisition unit 103.

The event delivery necessity concurrent acquisition unit 103 first transmits the confirmation request of event delivery necessity to each screen layer.

Specifically, as illustrated in step ST301, the event delivery necessity concurrent acquisition unit 103 acquires, from the screen layer management unit 107, information on the highest screen layer that has not yet received the confirmation request of event delivery necessity.

Next, as illustrated in step ST302, the confirmation request of event delivery necessity is transmitted from the event delivery necessity concurrent acquisition unit 103 to the screen layer corresponding to the information acquired in step ST301. Specifically, the event delivery necessity concurrent acquisition unit 103 transmits information on the user input event to the screen layer management unit 107 to cause the screen layer management unit 107 to concurrently collate, for each screen layer, the information on the user input event with information on each screen layer.

Next, as illustrated in step ST303, the event delivery necessity concurrent acquisition unit 103 confirms whether the confirmation request of event delivery necessity has been transmitted to all the screen layers. When the confirmation request of event delivery necessity has been transmitted to all the screen layers (Yes), the event delivery necessity confirmation request process ends. When the confirmation request of event delivery necessity has not been transmitted to all the screen layers (No), the process returns to step ST301.

FIG. 4 is a flowchart illustrating a confirmation process flow of event delivery necessity to be performed for each screen layer.

Upon receipt of the confirmation request of event delivery necessity for each screen layer, the screen layer management unit 107 performs the confirmation process of event delivery necessity concurrently with processes of other screen layers.

Specifically, first, as illustrated in step ST401, the screen layer management unit 107 acquires information on the corresponding screen layer from the in-screen layer information storage unit 108, and confirms delivery necessity of the user input event for each screen layer. In this case, a method for confirming event delivery necessity of each screen layer is not limited to a specific case. For example, the method for confirming event delivery necessity of each screen layer may be a method for setting a threshold for each screen layer, and when an alpha value at coordinates on the screen corresponding to the user input event exceeds the threshold, accepting the user input event, and when the alpha value at coordinates on the screen corresponding to the user input event does not exceed the threshold, not accepting the user input event. The method for confirming event delivery necessity of each screen layer may be a method under which the information itself on the screen layer retains delivery necessity of the user input event, or may be a method for making an inquiry to an object displayed in the screen layer.

Next, as illustrated in step ST402, the delivery necessity of the user input event confirmed in step ST401 is returned from each screen layer to the event delivery necessity concurrent acquisition unit 103.

Figure 5:
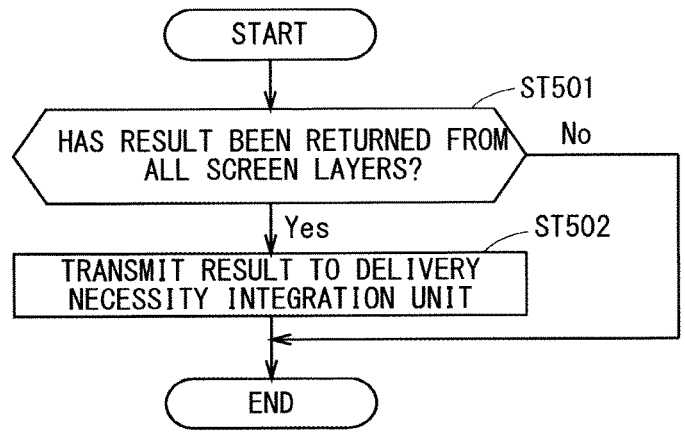
FIG. 5 is a flowchart illustrating a transmission propriety determination process flow for determining propriety of transmitting a result to an event delivery necessity integration unit.

FIG. 5 is a flowchart illustrating a transmission propriety determination process flow for determining propriety of transmitting a result to the event delivery necessity integration unit 104.

Upon receipt of the confirmation result of event delivery necessity returned in step ST402, the event delivery necessity concurrent acquisition unit 103 performs a transmission propriety determination process for determining whether to transmit the returned confirmation result of event delivery necessity to the event delivery necessity integration unit 104.

Specifically, first, as illustrated in step ST501, determination is made in the event delivery necessity concurrent acquisition unit 103 whether the result of the confirmation process of event delivery necessity has been returned from all the screen layers. When the result of the event delivery necessity confirmation process has been returned from all the screen layers (Yes), the event delivery necessity concurrent acquisition unit 103 transmits all the result to the event delivery necessity integration unit 104 (see step ST502). When the result of the event delivery necessity confirmation process has not been returned from all the screen layers (No), the event delivery necessity concurrent acquisition unit 103 ends the process without doing anything. This transmission propriety determination process is performed in response to a reply of the results of all the confirmation processes of event delivery necessity that are processed concurrently.

Figure 6:
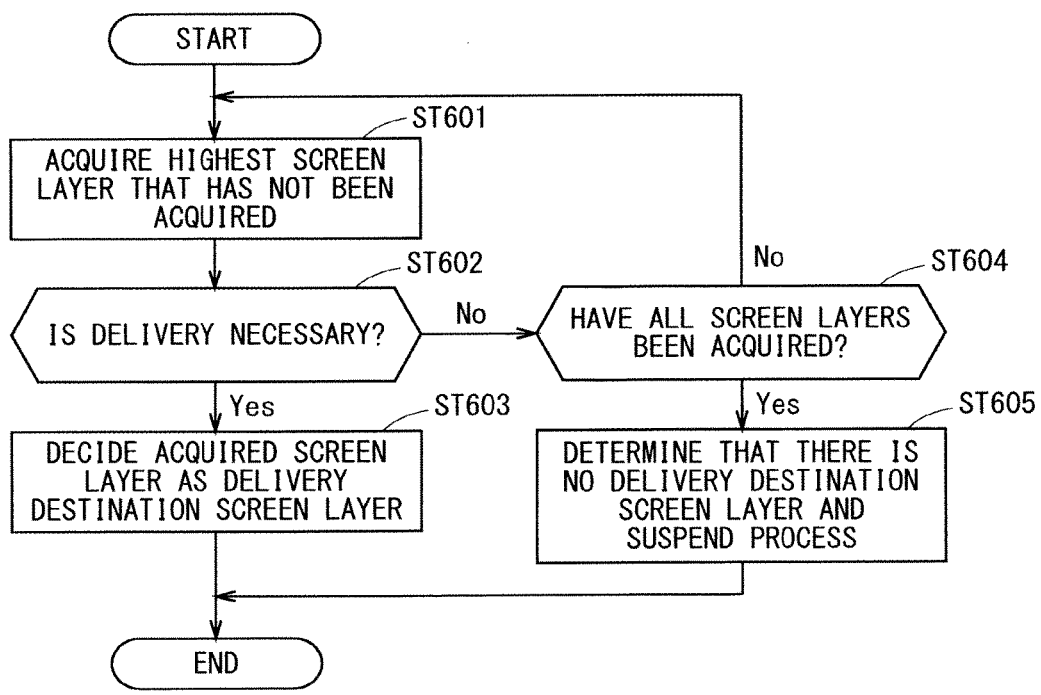
FIG. 6 is a flowchart illustrating an integration process flow of event delivery necessity in the event delivery necessity integration unit.

FIG. 6 is a flowchart illustrating an integration process flow of event delivery necessity in the event delivery necessity integration unit 104.

In the event delivery necessity integration unit 104, the event delivery necessity acquired by the event delivery necessity concurrent acquisition unit 103 is integrated, and the screen layer to which the user input event is to be delivered is decided.

Specifically, first, as illustrated in step ST601, the event delivery necessity integration unit 104 acquires, from the screen layer management unit 107, information on the highest screen layer from information on the screen layer that has not been acquired.

Next, as illustrated in step ST602, the event delivery necessity integration unit 104 uses the result of the event delivery necessity confirmation process acquired from the event delivery necessity concurrent acquisition unit 103 to determine the event delivery necessity of the screen layer corresponding to the information acquired in step ST601. When the event delivery is necessary (Yes), the process proceeds to step ST603. When the event delivery is not necessary (No), the process proceeds to step ST604.

In step ST603, since the screen layer that requires event delivery is found out, the event delivery necessity integration unit 104 decides the screen layer corresponding to the information acquired in step ST601 as the delivery destination screen layer of the user input event.

Meanwhile, in step ST604, the event delivery necessity integration unit 104 determines whether the information on all the screen layers has been acquired from the screen layer management unit 107. When the information on all the screen layers has been acquired (Yes), the process proceeds to step ST605. When all the screen layers have not been acquired (No), the process returns to step ST601.

In step ST605, since it is not necessary to deliver the user input event for all the screen layers, the event delivery necessity integration unit 104 determines that there is no delivery destination screen layer of the user input event, and ends the process without delivering the currently processed user input event.

Thus, in the present embodiment, when deciding the delivery destination screen layer of the user input event, by performing the confirmation process of delivery necessity of the user input event concurrently for all the screen layers, even when many screen layers that do not receive the user input event are superimposed above the screen layer that should receive the user input event, it is possible to decide the delivery destination screen layer at a high speed without obstructing change in the position or shape of the object or the position or shape of the screen layer, or occupation of a large amount of storage area.

<Second Embodiment>

Hereinafter, components similar to components described in the above-described embodiment are denoted with the same reference numerals, and detailed descriptions thereof will be omitted as necessary.

In the first embodiment, as illustrated in FIG. 5 as a transmission propriety determination process in an event delivery necessity concurrent acquisition unit 103, an operation of transmitting a confirmation result of event delivery necessity to an event delivery necessity integration unit 104 after acquisition of the confirmation result of event delivery necessity of all screen layers is described. However, if possible, the confirmation result of event delivery necessity may be transmitted to the event delivery necessity integration unit 104 before acquisition of the confirmation result of event delivery necessity of all the screen layers.

In the present embodiment, while acquiring the confirmation result of event delivery necessity of respective screen layers concurrently from the screen layers, in order to complete the acquisition more quickly, even if the confirmation process of event delivery necessity is not completed for all the screen layers, the acquisition of the confirmation result of event delivery necessity is ended depending on conditions, and the event delivery necessity concurrent acquisition unit 103 transmits the confirmation result of event delivery necessity acquired at that time to the event delivery necessity integration unit 104.

FIG. 8 is a flowchart illustrating a process flow in a case where the event delivery necessity concurrent acquisition unit 103 transmits the confirmation result of event delivery necessity to the event delivery necessity integration unit 104 when preset conditions are satisfied and even when one or more screen layers have not returned the confirmation result of event delivery necessity.

In FIG. 8, processes denoted with the same reference numerals as in the case of FIG. 5 are processes having the same functions or functions corresponding thereto, and thus descriptions thereof will be omitted.

First, as illustrated in step ST801, when the confirmation result of event delivery necessity is returned, in the event delivery necessity concurrent acquisition unit 103, determination is made whether reception of the confirmation result of event delivery necessity satisfies a condition set in advance by a designer. When the condition is satisfied (Yes), the process proceeds to step ST802, and when the condition is not satisfied (No), the process proceeds to step ST501.

In step ST802, the event delivery necessity concurrent acquisition unit 103 instructs each screen layer that is currently performing a process to suspend the process.

In addition, more specifically, when the confirmation result of event delivery necessity is returned, in a case where all the screen layers that exist higher than the screen layer that has returned the confirmation result of event delivery necessity have already returned the confirmation result of event delivery necessity, even when the screen layers that exist lower than the screen layer that has returned the confirmation result of event delivery necessity have not returned the confirmation result of event delivery necessity, this does not affect an integration process of event delivery necessity, and thus the confirmation result of event delivery necessity may be transmitted.

Figure 9:
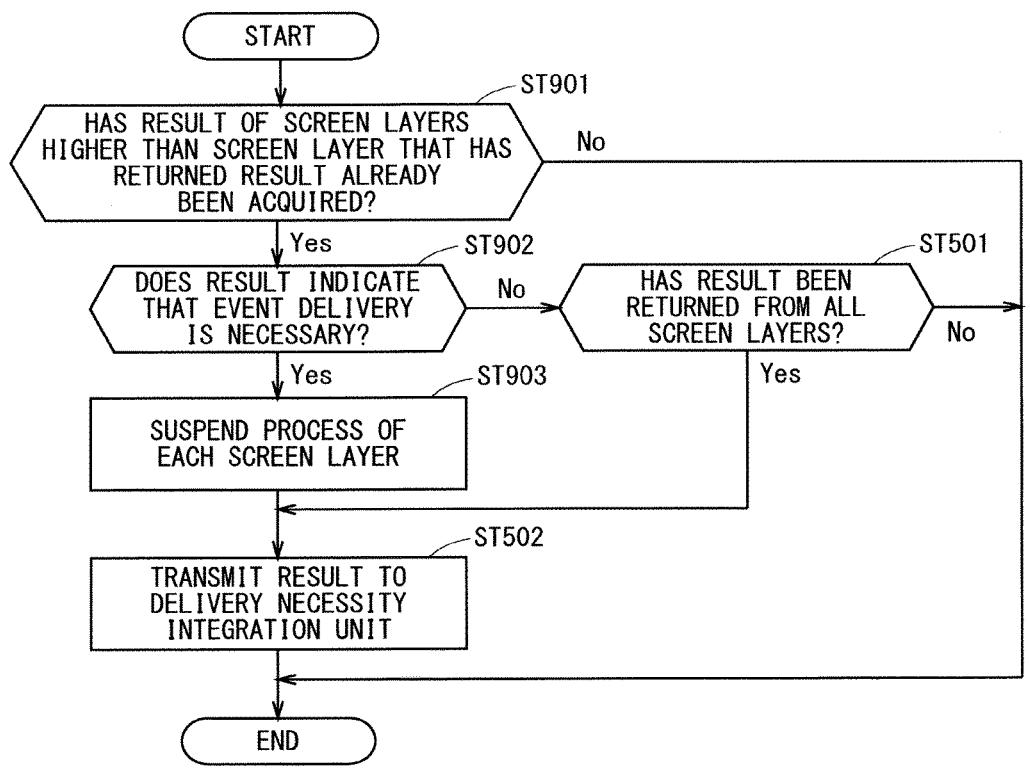
FIG. 9 is a flowchart illustrating the process flow in the case of transmitting the confirmation result of event delivery necessity even when one or more screen layers do not return the confirmation result of event delivery necessity.

FIG. 9 is a flowchart illustrating a process flow in a case where the event delivery necessity concurrent acquisition unit 103 transmits the confirmation result of event delivery necessity to the event delivery necessity integration unit 104 when the confirmation result of event delivery necessity is returned, if all the screen layers that exist higher than the screen layer that has returned the confirmation result of event delivery necessity have already returned the confirmation result of event delivery necessity, even if the screen layers that exist lower than the screen layer that has returned the confirmation result of event delivery necessity have not returned the confirmation result of event delivery necessity.

In FIG. 9, processes denoted with the same reference numerals as in the case of FIG. 5 are processes having the same functions or functions corresponding thereto, and thus descriptions thereof will be omitted.

First, as illustrated in step ST901, when the confirmation result of event delivery necessity is returned, the event delivery necessity concurrent acquisition unit 103 determines whether the confirmation result of event delivery necessity of all the screen layers higher than the screen layer that has returned the confirmation result of event delivery necessity has already been acquired. When the confirmation result has already been acquired (Yes), the process proceeds to step ST902. When the confirmation result has not been acquired (No), the process ends immediately.

In step ST902, the event delivery necessity concurrent acquisition unit 103 determines whether the confirmation result of event delivery necessity needs delivery of the user input event. When the confirmation result of event delivery necessity needs delivery of the user input event (Yes), the process proceeds to step ST903. When the confirmation result of event delivery necessity does not need delivery of the user input event (No), the process proceeds to step ST501.

In step ST903, the event delivery necessity concurrent acquisition unit 103 instructs each screen layer that is currently performing a process to suspend the process.

Note that in the above example, in a case where the confirmation process of event delivery necessity of each screen layer ends, when the preset condition is satisfied, the event delivery necessity concurrent acquisition unit 103 transmits the confirmation result of event delivery necessity to the event delivery necessity integration unit 104; however, this process can be performed by the event delivery necessity integration unit 104 as well, instead of by the event delivery necessity concurrent acquisition unit 103. That is, when the preset condition is satisfied, the event delivery necessity integration unit 104 may immediately perform the process for deciding a delivery destination screen layer of the user input event, without passing through the event delivery necessity concurrent acquisition unit 103.

Thus, in the present embodiment, even if the confirmation process of event delivery necessity is not completed for all the screen layers, it is possible to transmit the confirmation result of event delivery necessity to the event delivery necessity integration unit 104, and it is further possible for the event delivery necessity integration unit 104 to decide the screen layer in which the user input event is accepted on the basis of the determination result on some screen layers among the plurality of screen layers, enabling decision of the delivery destination screen layer of the user input event at a higher speed.

<Third Embodiment>

Hereinafter, components similar to components described in the above-described embodiments are denoted with be same reference numerals, and detailed descriptions thereof will be omitted as necessary.

In the first embodiment, as illustrated in FIG. 3, in a confirmation request process of event delivery necessity in an event delivery necessity concurrent acquisition unit 103, a screen layer management unit 107 has requested all screen layers to perform a confirmation process of event delivery necessity; however, the number of screen layers that are requested to perform the confirmation process of event delivery necessity may be limited. Even when concurrently performing the confirmation process of event delivery necessity, since there is a limit to the process that each core of a processing device 202 can perform, it is possible to speed up each process by limiting the number of processes each core performs.

Figure 10:
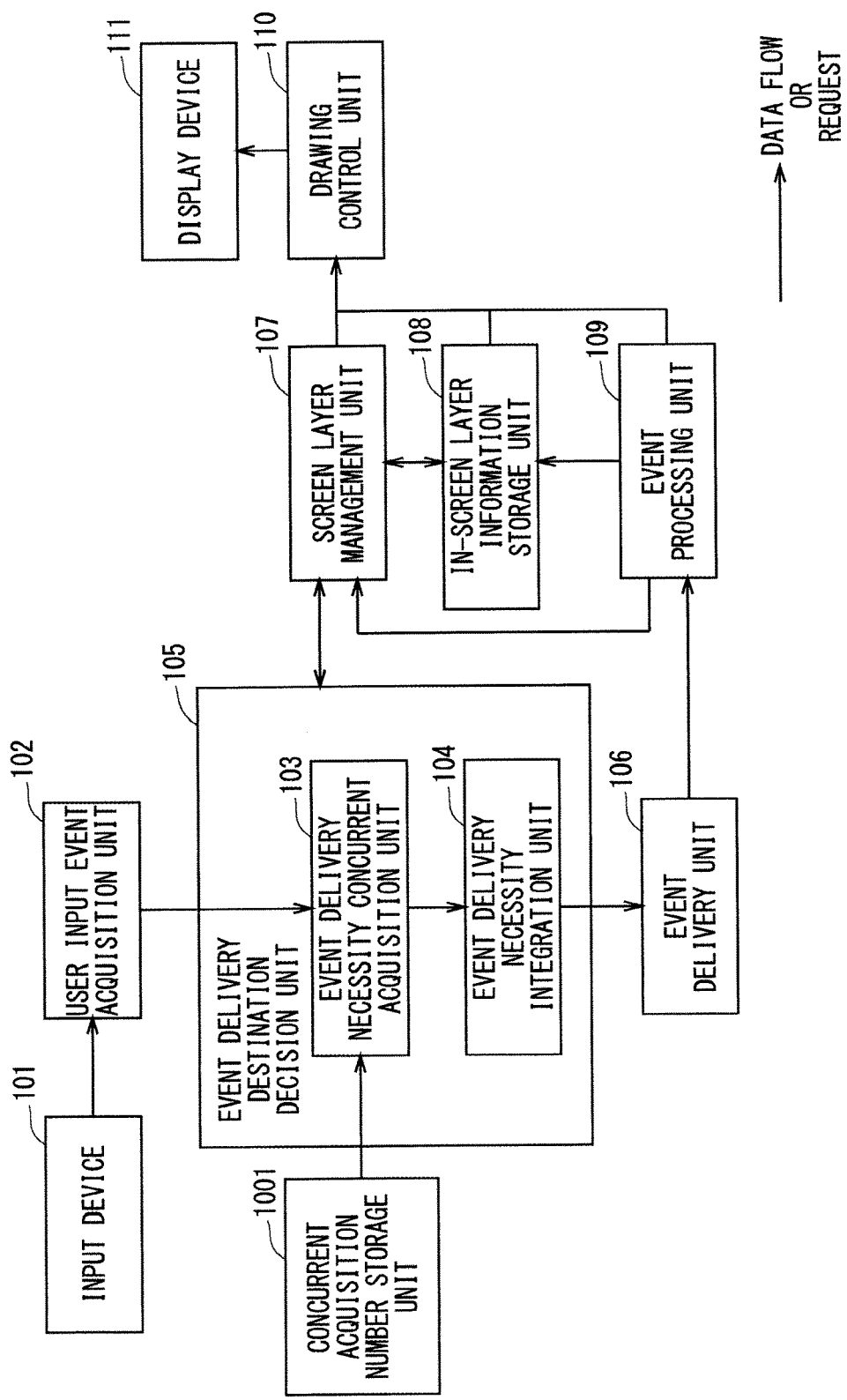
FIG. 10 is a diagram conceptually illustrating the configuration of the user interface device according to the embodiment.

FIG. 10 is a diagram conceptually illustrating a configuration of a user interface device according to the present embodiment.

Among components of the user interface device illustrated in FIG. 10, components similar to the components of the user interface device illustrated in FIG. 1 are denoted with the same reference numerals, and descriptions thereof will be omitted.

In the present embodiment, the user interface device includes a concurrent acquisition number storage unit 1001 that stores the number of screen layers that concurrently perform the confirmation process of event delivery necessity. The concurrent acquisition number storage unit 1001 is implemented by, for example, a storage device 203 such as a RAM or a hard disk in a computer 201, but may be implemented by an external storage medium.

When performing the confirmation request process of event delivery necessity, the event delivery necessity concurrent acquisition unit 103 decides the number of screen layers to be requested to perform the confirmation process of event delivery necessity on the basis of a value stored in the concurrent acquisition number storage unit 1001. The number of screen layers to be stored in the concurrent acquisition number storage unit 1001 is decided, for example, depending on a processing speed in the screen layer management unit 107.

Figure 11:
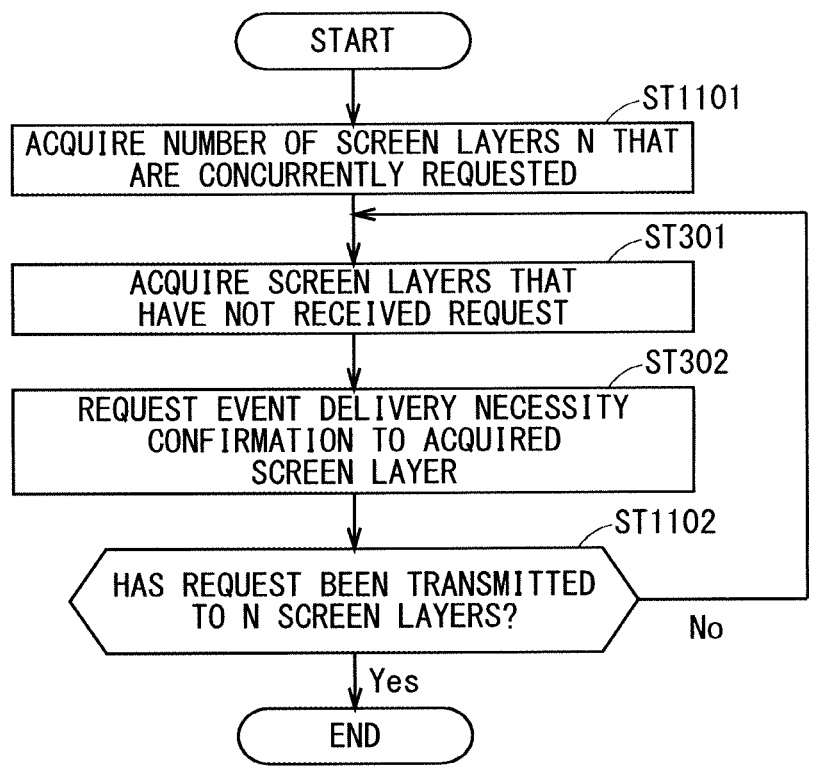
FIG. 11 is a flowchart illustrating the process flow of the confirmation request of event delivery necessity to each screen layer in the event delivery necessity concurrent acquisition unit.

FIG. 11 is a flowchart illustrating a process flow of the confirmation request of event delivery necessity to each screen layer in the event delivery necessity concurrent acquisition unit 103 according to the present embodiment.

In FIG. 11, processes denoted with the same reference numerals as in the case of FIG. 3 are processes having the same functions or functions corresponding thereto, and thus descriptions thereof will be omitted.

First, as illustrated in step ST1101, the event delivery necessity concurrent acquisition unit 103 acquires the value stored in the concurrent acquisition number storage unit 1001.

In step ST1102, the event delivery necessity concurrent acquisition unit 103 determines whether the confirmation request of event delivery necessity has been transmitted to the number of screen layers based on the value acquired in step ST1101. When the confirmation request has been transmitted (Yes), the process ends. When the confirmation request has not been transmitted (No), the process returns to step ST301.

Figure 12:
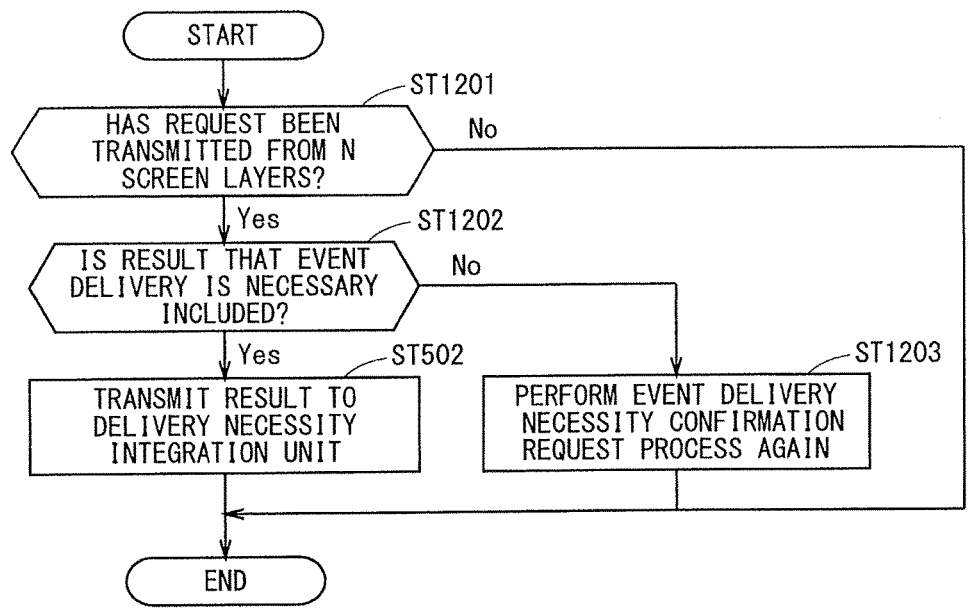
FIG. 12 is a flowchart illustrating the transmission propriety determination process flow in the event delivery necessity concurrent acquisition unit.

FIG. 12 is a flowchart illustrating a determination process flow of transmission propriety of the event delivery necessity concurrent acquisition unit 103 according to the present embodiment.

In FIG. 12, processes denoted with the same reference numerals as in the case of FIG. 5 are processes having the same functions or functions corresponding thereto, and thus descriptions thereof will be omitted.

First, as illustrated in step ST1201, in the event delivery necessity concurrent acquisition unit 103, the number of screen layers based on the value stored in the concurrent acquisition number storage unit 1001 are processed concurrently in the screen layer management unit 107, and determination is made whether the confirmation result of event delivery necessity has been returned. When the confirmation result of event delivery necessity has been returned from the number of screen layers based on the value stored in the concurrent acquisition number storage unit 1001 (Yes), the process proceeds to step ST1202. When the confirmation result of event delivery necessity has not been returned from the number of screen layers based on the value stored in the concurrent acquisition number storage unit 1001 (No), the process ends.

Note that a method for storing the value in the concurrent acquisition number storage unit 1001 and a method for using the value stored in the concurrent acquisition number storage unit 1001 may be any method. For example, a designer may store in advance the value in the concurrent acquisition number storage unit 1001, and the value may be always identical while the user interface device according to the present embodiment operates. In addition, the value stored in the concurrent acquisition number storage unit 1001 may be directly used, or a result calculated on the basis of the value stored in the concurrent acquisition number storage unit 1001 may be used.

In addition, information to be stored may be data in any form as long as the information can be interpreted when used, such as a value, a character string, a list, or a binary; however, in the present embodiment, an example in which the information is a value is described. A specific example regarding the method by which the value is stored in the concurrent acquisition number storage unit 1001 and the method for using the value stored in the concurrent acquisition number storage unit 1001 will be described below.

As one example, when the confirmation process of event delivery necessity is performed concurrently, since the processing speed depends on the number of cores of the processing device 202, that is, the number of central processing units (CPUs), a method for acquiring the number of cores of the processing device 202 and storing the number of cores in the concurrent acquisition number storage unit 1001 will be described.

Figure 13:
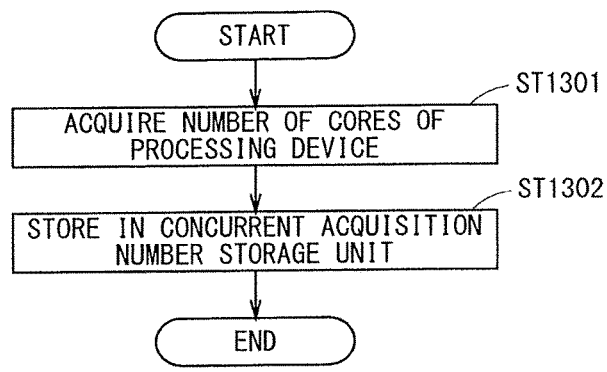
FIG. 13 is a flowchart of a process for acquiring the number of cores of a processing device and storing the number of cores in a concurrent acquisition number storage unit.

FIG. 13 is a flowchart of a process for acquiring the number of cores of the processing device 202 and storing the number of cores in the concurrent acquisition number storage unit 1001.

First, as illustrated in step ST1301, information on the number of cores of the processing device 202 is obtained from outside. Next, as illustrated in step ST1302, the acquired information on the number of cores is stored in the concurrent acquisition number storage unit 1001.

At this time, timing of storing the value in the concurrent acquisition number storage unit 1001 may be any timing before the process of the event delivery necessity concurrent acquisition unit 103 is performed, and one example is a method for storing the value when the user interface device is activated. In a case where the number of cores of the processing device 202 does not fluctuate, this storage process may be performed only once at any timing. Meanwhile, in a case where the number of cores of the processing device 202 fluctuates, it is necessary to perform the storage process again before the event delivery necessity concurrent acquisition unit 103 performs the process or when the number of cores of the processing device 202 fluctuates.

As one example, since the processing device 202 may perform processes other than the process of the event delivery necessity concurrent acquisition unit 103, such as processes of other applications, a method will be described for acquiring the number of cores of the processing device 202 that is not performing any processes or has a low usage rate, and storing the number of cores in the concurrent acquisition number storage unit 1001. Note that the usage rate that serves as a threshold may be decided in advance, or may be dynamically varied while processes are performed.

FIG. 14 is a flowchart illustrating a process for acquiring the number of cores of the processing device that is not performing any processes or has a low usage rate, and storing the number of cores in the concurrent acquisition number storage unit 1001.

First, in step ST1401, information on the number of cores of the processing device that is not performing any processes or has a low usage rate is acquired. Next, in step ST1402, the acquired information on the number of cores is stored in the concurrent acquisition number storage unit 1001.

At this time, it is preferable that the timing of storing the value in the concurrent acquisition number storage unit 1001 is immediately before the process of the event delivery necessity concurrent acquisition unit 103 is performed, but the timing is not limited thereto. For example, there is also a method for monitoring the process that the processing device 202 is performing, and storing the value in the concurrent acquisition number storage unit 1001 when the number of cores of the processing device 202 that is not performing processes fluctuates.

Thus, in the present embodiment, since it is possible to speed up each process and to sequentially perform these processes by limiting the number of confirmation request processes of event delivery necessity performed concurrently by the screen layer management unit 107, it is possible to decide the user input event delivery destination screen layer at a high speed, in particular, when the screen layer whose turn to transmit the confirmation request of event delivery necessity comes early needs the user input event.

<Fourth Embodiment>

Hereinafter, components similar to components described in the above-described embodiments are denoted with the same reference numerals, and detailed descriptions thereof will be omitted as necessary.

In the first embodiment, as illustrated in FIG. 3, in a confirmation request process of event delivery necessity in an event delivery necessity concurrent acquisition unit 103, the confirmation request of event delivery necessity has been transmitted in order from the highest screen layer; however, priority order may be set for each screen layer and the confirmation request of event delivery necessity may be transmitted in accordance with the priority order.

Setting the priority order makes it possible to level out processes assigned to respective cores of a processing device 202, or to early perform the confirmation process of event delivery necessity of the screen layer having a high possibility of receiving a user input event. As illustrated in the second embodiment and the third embodiment, this is particularly effective when it is possible to decide a delivery destination screen layer of the user input event without transmitting the confirmation request of event delivery necessity to all screen layers.

FIG. 15 is a diagram conceptually illustrating a configuration of a user interface device according to the present embodiment.

Among components of the user interface device illustrated in FIG. 15, components similar to components of the user interface device illustrated in FIG. 1 are denoted with the same reference numerals, and descriptions thereof will be omitted.

In the present embodiment, the user interface device includes a priority storage unit 1501 that stores priority for deciding priority order for transmitting the confirmation request of event delivery necessity. The priority storage unit 1501 is implemented by, for example, a storage device 203 such as a RAM or a hard disk in a computer 201, but may be implemented by an external storage medium.

When performing the confirmation request process of event delivery necessity, the event delivery necessity concurrent acquisition unit 103 transmits the confirmation request of event delivery necessity to each screen layer on the basis of the priority stored in the priority storage unit 1501.

Figure 16:
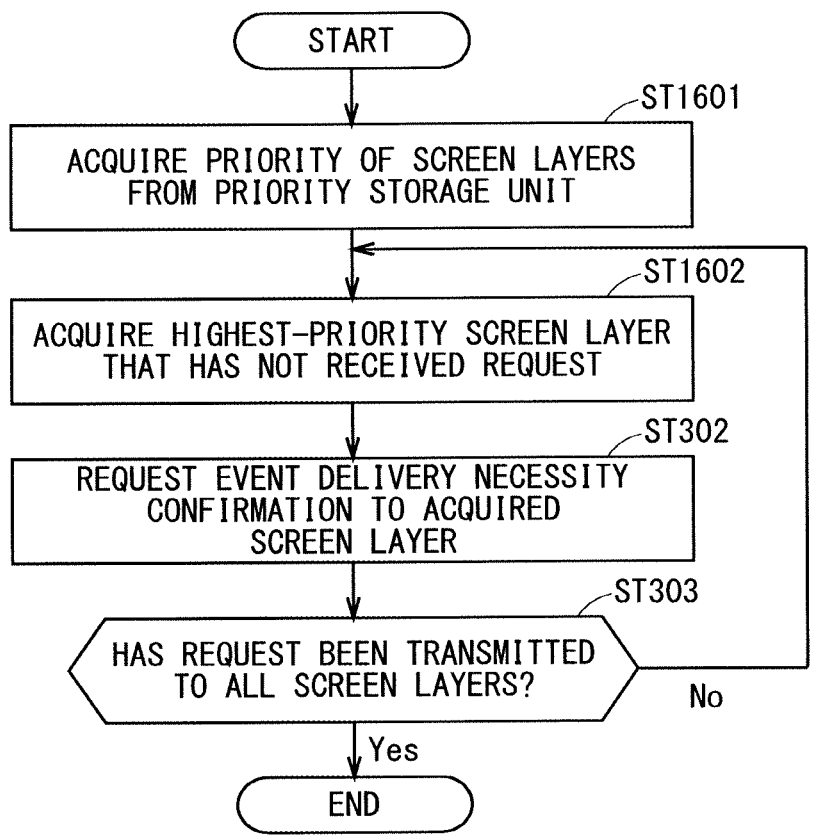
FIG. 16 is a flowchart illustrating the confirmation request process flow of event delivery necessity in the event delivery necessity concurrent acquisition unit.

FIG. 16 is a flowchart illustrating a confirmation request process flow of event delivery necessity in the event delivery necessity concurrent acquisition unit 103 according to the present embodiment.

In FIG. 16, processes denoted with the same reference numerals as in the case of FIG. 3 are processes having the same functions or functions corresponding thereto, and thus descriptions thereof will be omitted.

First, as illustrated in step ST1601, the event delivery necessity concurrent acquisition unit 103 acquires priority of each screen layer from the priority storage unit 1501.

In step ST1602, the event delivery necessity concurrent acquisition unit 103 acquires the screen layer having the highest priority among the screen layers to which the confirmation request of event delivery necessity has not yet been transmitted.

Note that a method for storing the priority in the priority storage unit 1501 and a method for using the priority stored in the priority storage unit 1501 may be any method. For example, a designer may store the priority in advance, and the priority may always be an identical value while the user interface device according to the present embodiment operates. In addition, the priority stored in the priority storage unit 1501 may be directly used, or a result calculated on the basis of the priority stored in the priority storage unit 1501 may be used.

In addition, information to be stored may be data in any form as long as the information can be interpreted when used, such as a value, a character string, a list, or a binary. A specific example regarding a method for storing the priority in the priority storage unit 1501 and a method for using the priority stored in the priority storage unit 1501 according to the present embodiment will be described below.

As one example, a description will be provided about a case where the priority is set in accordance with a type of application.

In the user interface device according to the present embodiment, various applications are simultaneously operating in some cases, such as an application displaying a map or an application displaying a video. There is a possibility that these applications display content to be displayed on a screen layer and receive a user input event, as other screen layers do. In this example, the order to transmit the confirmation request of event delivery necessity is decided in accordance with the applications that are being displayed.

For example, when priority of an application displaying a map is higher than priority of an application displaying a video, the confirmation request of event delivery necessity is first transmitted to the screen layer displaying the map-displaying application.

Figure 17:
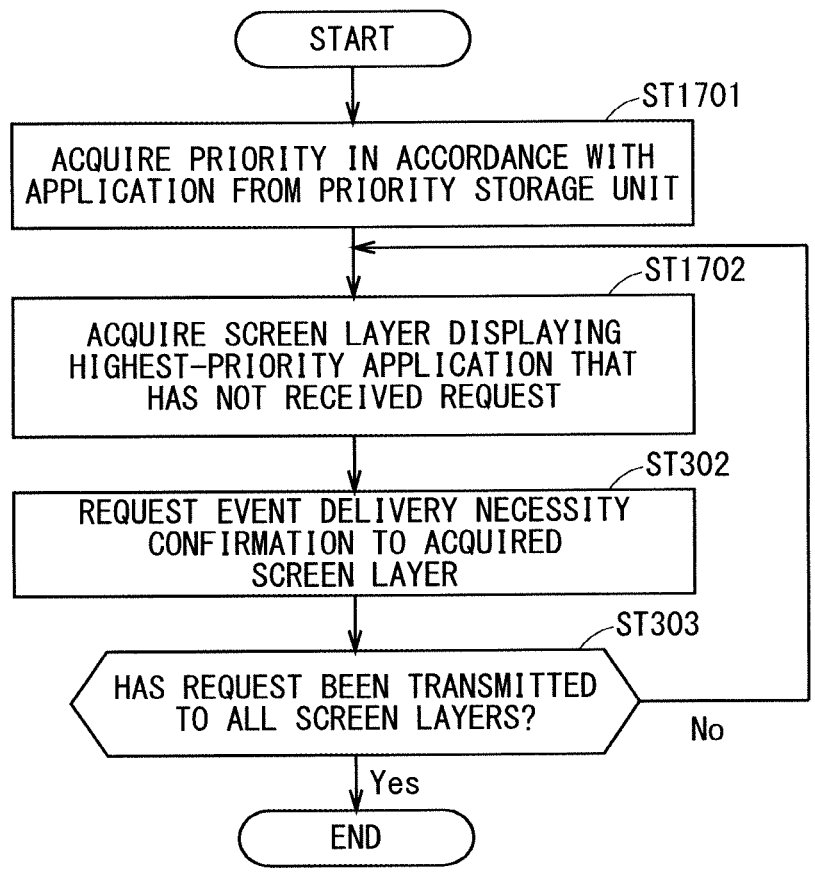
FIG. 17 is a flowchart illustrating the confirmation request process flow of event delivery necessity in a case where priority in accordance with a type of application is stored in a priority storage unit.

FIG. 17 is a flowchart illustrating the confirmation request process flow of event delivery necessity in the event delivery necessity concurrent acquisition unit 103 in a case where the priority in accordance with the type of application is stored in the priority storage unit 1501.

In FIG. 17, processes denoted with the same reference numerals as in the case of FIG. 16 are processes having the same functions or functions corresponding thereto, and thus descriptions thereof will be omitted.

First, as illustrated in step ST1701, the event delivery necessity concurrent acquisition unit 103 acquires the priority in accordance with the type of application from the priority storage unit 1501.

In step ST1702, the event delivery necessity concurrent acquisition unit 103 acquires the screen layer displaying the highest-priority application among the screen layers to which the confirmation request of event delivery necessity has not been transmitted. Note that the screen layers that are not displaying applications may be in any priority order. For example, a method may be used by which, after the confirmation request of event delivery necessity is transmitted to the screen layer that is displaying an application, the confirmation request of event delivery necessity is transmitted to the screen layer that is not displaying an application. In addition, when there exists a screen layer displaying a plurality of applications, any priority may be decided on the screen layer. For example, the priority of one of the applications may be used, or the screen layer displaying the plurality of applications may be provided with the highest priority.

As one example, a description will be provided about a case where the priority is set in accordance with the type of user input event. As the type of user input event, various types exist as described in the first embodiment. In this example, it is assumed that the priority is set on each type of user input event, and the order to transmit the confirmation request of event delivery necessity is decided in accordance with the type of each user input event.

Figure 18:
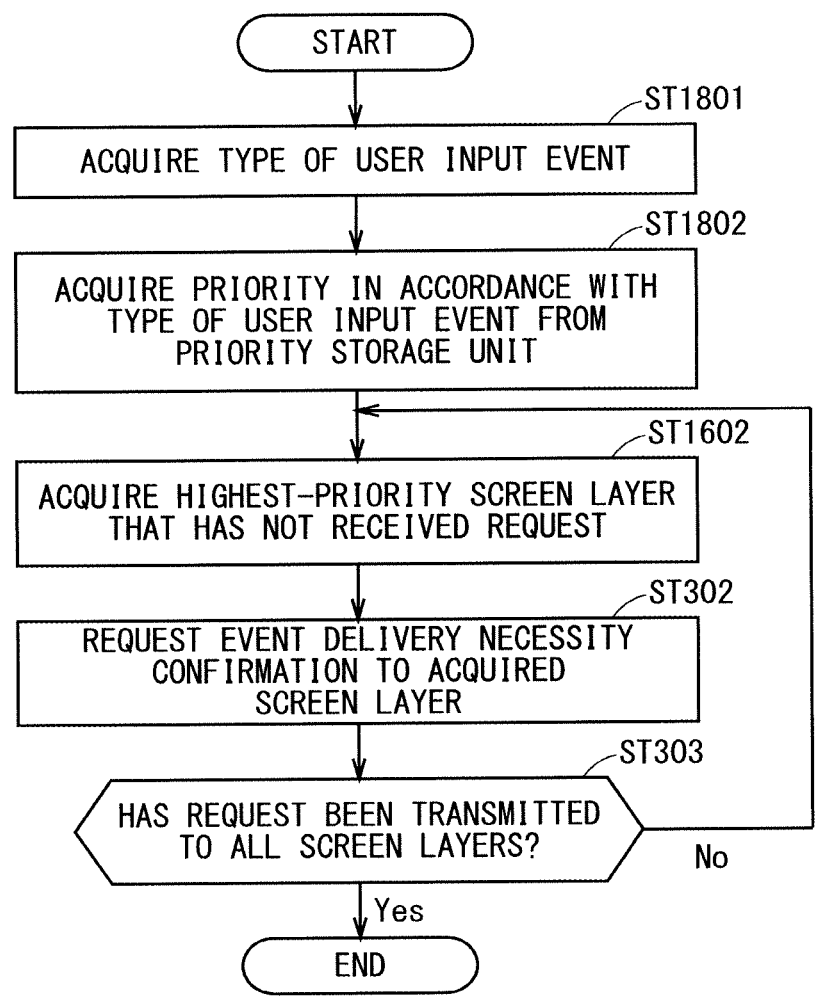
FIG. 18 is a flowchart illustrating the confirmation request process flow of event delivery necessity in a case where priority in accordance with a type of user input event is stored in the priority storage unit.

FIG. 18 is a flowchart illustrating the confirmation request process flow of event delivery necessity in the event delivery necessity concurrent acquisition unit 103 in a case where the priority in accordance with the type of user input event is stored in the priority storage unit 1501.

In FIG. 18, processes denoted with the same reference numerals as in the case of FIG. 16 are processes having the same functions or functions corresponding thereto, and thus descriptions thereof will be omitted.

First, as illustrated in step ST1801, the event delivery necessity concurrent acquisition unit 103 acquires the type of user input event.

In step ST1802, in accordance with the acquired type of user input event, the event delivery necessity concurrent acquisition unit 103 acquires the priority from the priority storage unit 1501. Here, the priority stored in the priority storage unit 1501 does not necessarily need to correspond one-to-one to the type of user input event, and several types may be regarded as an identical type to decrease the priority to store.

As one example, a description will be provided about a case where the priority is set in accordance with a state of the user interface device. The user interface device may change behavior thereof in various ways in accordance with the state at different times. For example, in a vehicle-mounted information device, there is a state in which the vehicle is driving and a state in which the vehicle is stopped, and a specific operation or input cannot be performed during driving in some cases. Since the type of user input event that can be input into the event delivery necessity concurrent acquisition unit 103 is limited in accordance with the state of the user interface device, the type of user input event that is accepted in the event delivery necessity concurrent acquisition unit 103 can be specified. In this example, it is assumed that the priority is set in the priority storage unit 1501 in accordance with each state of the user interface device, and the order to transmit the confirmation request of event delivery necessity is decided in accordance with each state of the user interface device.

Figure 19:
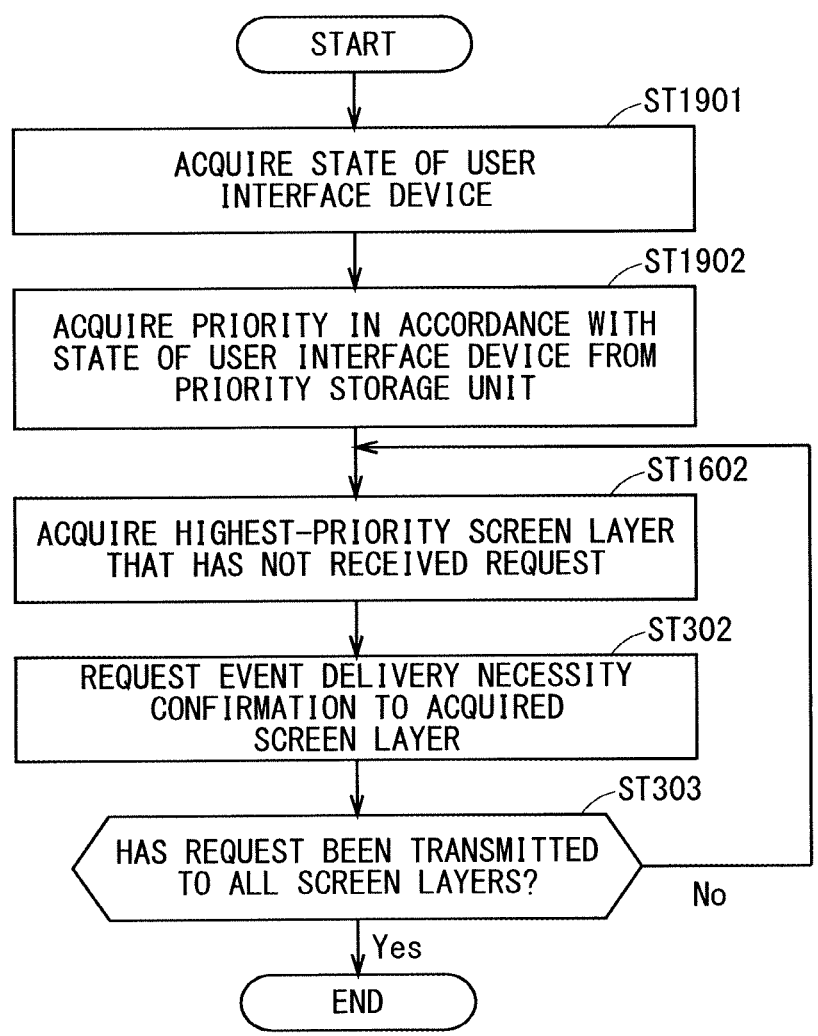
FIG. 19 is a flowchart illustrating the confirmation request process flow of event delivery necessity in a case where priority in accordance with a state of the user interface device is stored in the priority storage unit.

FIG. 19 is a flowchart illustrating the confirmation request process flow of event delivery necessity in the event delivery necessity concurrent acquisition unit 103 in a case where the priority in accordance with the state of the user interface device is stored in the priority storage unit 1501.

In FIG. 19, processes denoted with the same reference numerals as in the case of FIG. 16 are processes having the same functions or functions corresponding thereto, and thus descriptions thereof will be omitted.

First, as illustrated in step ST1901, the event delivery necessity concurrent acquisition unit 103 acquires the state of the user interface device.

In step ST1902, in accordance with the acquired state of the user interface device, the event delivery necessity concurrent acquisition unit 103 acquires the priority from the priority storage unit 1501. The state of the user interface device is not limited to the state of the vehicle-mounted information device during driving and stopping, and may be any other states.

As one example, a description will be provided about a case where the priority is set in accordance with a connection state with an external device. The user interface device may be connected with various external devices such as a smartphone or a tablet, and display an application or display content of the external device on the screen layer in some cases. Since communication with external devices tends to be slower than communication within the user interface device, changing the priority such as increasing or decreasing the priority of the screen layer displaying information on the external device in accordance with the connection state with the external device makes it possible to efficiently perform the confirmation request process of event delivery necessity in some cases.

FIG. 20 is a flowchart lustrating the confirmation request process flow of event delivery necessity in the event delivery necessity concurrent acquisition unit 103 in a case where the priority in accordance with the connection state with the external device is stored in the priority storage unit 1501.

In FIG. 20, processes denoted with the same reference numerals as in the case of FIG. 16 are processes having the same functions or functions corresponding thereto, and thus descriptions thereof will be omitted.

First, as illustrated in step ST2001, the event delivery necessity concurrent acquisition unit 103 acquires the connection state with the external device.

In step ST2002, in accordance with the acquired connection state with the external device, the event delivery necessity concurrent acquisition unit 103 acquires the priority from the priority storage unit 1501. The external device in this example is not limited to a smartphone or a tablet, and may be any external device.

Thus, in the present embodiment, by deciding the order to perform the confirmation request of event delivery necessity to each screen layer in accordance with the priority order, it is possible to perform the efficient confirmation request process of event delivery necessity.

<Fifth Embodiment>

Hereinafter, components similar to components described in the above-described embodiments are denoted with the same reference numerals, and detailed descriptions thereof will be omitted as necessary.

In the first embodiment, a confirmation process of event delivery necessity has been performed concurrently in each screen layer in any cases; however, it is faster in some cases to decide an event delivery destination using other methods including a conventional method. Therefore, another event delivery destination decision method different from the event delivery destination decision method in the first embodiment may be switched and used.

FIG. 21 is a diagram conceptually illustrating a configuration of a user interface device according to the present embodiment.

Among components of the user interface device illustrated in FIG. 21, components similar to the components of the user interface device illustrated in FIG. 1 are denoted with the same reference numerals, and descriptions thereof will be omitted here.

In the present embodiment, the user interface device includes an event delivery destination decision method switching unit 2101 that determines which event delivery destination decision method to use, and a second event delivery destination decision unit 2102 that performs an event delivery destination decision method different from the event delivery destination decision method described in the first embodiment. The event delivery destination decision method switching unit 2101 and the second event delivery destination decision unit 2102 are implemented by, for example, a processing device 202 in a computer 201 executing a program.

By including the event delivery destination decision method switching unit 2101 and the second event delivery destination decision unit 2102, it is possible for the second event delivery destination decision unit 2102 to switch the event delivery destination decision method on the basis of a determination result in the event delivery destination decision method switching unit 2101.

In FIG. 21, only the second event delivery destination decision unit 2102 is provided as a component for selecting another event delivery destination decision method; however, when a plurality of event delivery destination decision methods can be assumed as another event delivery destination decision method, a third event delivery destination decision unit, and furthermore a fourth event delivery destination decision unit may be provided as a component for selecting another event delivery destination decision method. Also, there is no upper limit to the number of components for selecting another event delivery destination decision method.

FIG. 22 is a flowchart illustrating a process flow of the event delivery destination decision method switching unit 2101 according to the present embodiment.

First, as illustrated in step ST2201, the event delivery destination decision method switching unit 2101 determines which event delivery destination decision method to use. When concurrent acquisition is performed as the event delivery destination decision method (Yes), the method of the first embodiment is used, and the process proceeds to step ST2202. When concurrent acquisition is not performed as the event delivery destination decision method (No), another event delivery destination decision method is used, and the process proceeds to step ST2203. In step ST2203, in order to employ another event delivery destination decision method, the process of the second event delivery destination decision unit 2102 is started.

Note that a condition for determining the event delivery destination decision method in the event delivery destination decision method switching unit 2101 may be any condition. For example, the condition may be a condition of switching depending on time, or a condition of randomly selecting either one. A specific example regarding the condition for determining the event delivery destination decision method in the event delivery destination decision method switching unit 2101 will be described below.

As one example, switching of the event delivery destination decision method depending on the number of screen layers will be described. In a case where the number of screen layers that require confirmation of event delivery necessity is small, when the confirmation process of event delivery necessity is performed concurrently, depending on time required for receiving or integrating a confirmation result of event delivery necessity, it may take longer time than sequentially performing confirmation of event delivery necessity. Therefore, when the number of screen layers that require confirmation of event delivery necessity is small, it is possible to more efficiently decide the user input event delivery destination screen layer by switching the process in a screen layer management unit 107 to another event delivery destination decision method such as a conventional sequential process.

FIG. 23 is a flowchart illustrating the process flow of the event delivery destination decision method switching unit 2101 in a case where the event delivery destination decision method is switched depending on the number of screen layers that require confirmation of event delivery necessity.

In FIG. 23, processes denoted with the same reference numerals as in the case of FIG. 22 are processes having the same functions or functions corresponding thereto, and thus descriptions thereof will be omitted.

First, as illustrated in step ST2301, the event delivery destination decision method switching unit 2101 determines whether the number of screen layers that require confirmation of event delivery necessity is equal to or greater than N. Here, it is assumed that N is a natural number. In addition, N may be set in any way, such as N is set in advance by a designer. When the number of screen layers that require confirmation of event delivery necessity is equal to or greater than N (Yes), the process proceeds to step ST2202. When the number of screen layers that require confirmation of event delivery necessity is not equal to or larger than N (No), the process proceeds to step ST2203. It should be noted that the switching condition of the event delivery destination decision method in FIG. 23 is one example, and the condition may be that the process proceeds to step ST2202 when the number of screen layers that require confirmation of event delivery necessity is equal to or less than N, or it is presumed that M is a natural number equal to or greater than N, and the condition may be that the process proceeds to step ST2202 when the number of screen layers that require confirmation of event delivery necessity is between N and M inclusive.

As one example, a description will be provided about switching of the event delivery destination decision method based on the number of cores of the processing device 202. When the number of cores of the processing device is small, few cores need to confirm event delivery necessity, and thus depending on time required for receiving or integrating the confirmation result of event delivery necessity, it may take longer time than sequentially performing confirmation of event delivery necessity. When the number of cores of the processing device is small, by switching to another event delivery destination decision method such as a conventional sequential process, the delivery destination screen layer of the user input event can be decided more efficiently.

Figure 24:
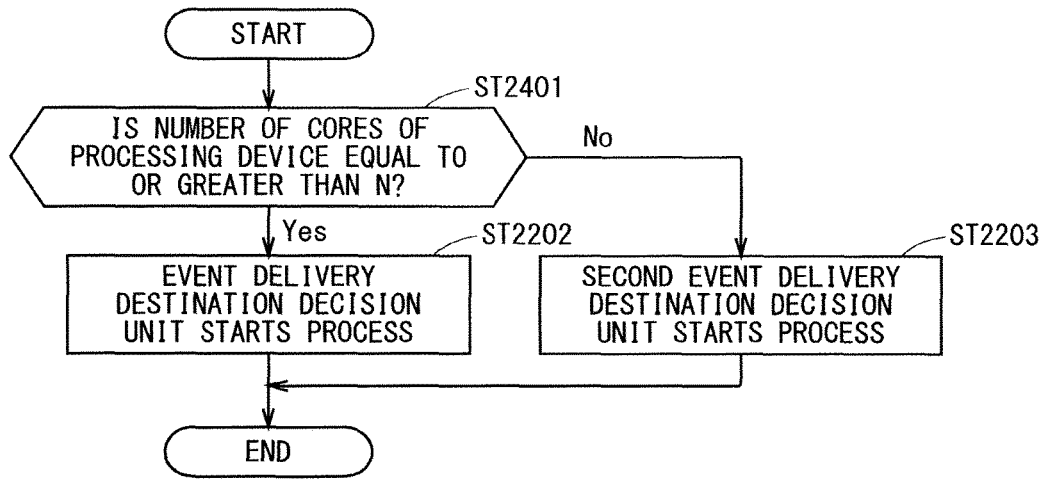
FIG. 24 is a flowchart illustrating a process flow in a case where the event delivery destination decision method is switched on the basis of the number of cores of the processing device.

FIG. 24 is a flowchart illustrating the process flow of the event delivery destination decision method switching unit 2101 when the event delivery destination decision method is switched on the basis of the number of cores of the processing device 202.

In FIG. 24, processes denoted with the same reference numerals as in the case of FIG. 22 are processes having the same functions or functions corresponding thereto, and thus descriptions thereof will be omitted.

First, as illustrated in step ST2401, the event delivery destination decision method switching unit 2101 determines whether the number of cores of the processing device 202 is equal to or greater than N. Here, it is assumed that N is a natural number. N may be set in any way, such as N is set in advance by the designer. When the number of cores of the processing device is equal to or greater than N (Yes), the process proceeds to step ST2202. When the number of cores of the processing device is not equal to or greater than N (No), the process proceeds to step ST2203. It should be noted that the switching condition of the event delivery destination decision method in FIG. 24 is one example, and the condition may be that the process proceeds to step ST2202 when the number of cores of the processing device 202 is equal to or less than N, or it is presumed that M is a natural number equal to or greater than N, and the condition may be that the process proceeds to step ST2202 when the number of cores of the processing device 202 is between N and M inclusive.

As one example, a description will be provided about switching of the event delivery destination decision method based on a type of user input event. Depending on the type of user input event, the event delivery destination decision method may be unsuitable, or an event delivery destination decision method capable of making a decision at a higher speed may exist. For example, when the type of user input event is drag, it is preferable in some cases to continue delivering subsequent user input event to the screen layer to which the drag event has been first delivered, as long as the drag event continues. Alternatively, in a multi-touch-enabled input device 101, two inputs are usually delivered to different screen layers, but in some cases, it is preferable to deliver two inputs to either screen layer as one gesture event such as pinch in. In these cases, it is possible to decide the delivery destination screen layer without performing the event delivery necessity confirmation process on each screen layer about each individual user input event.

Figure 25:
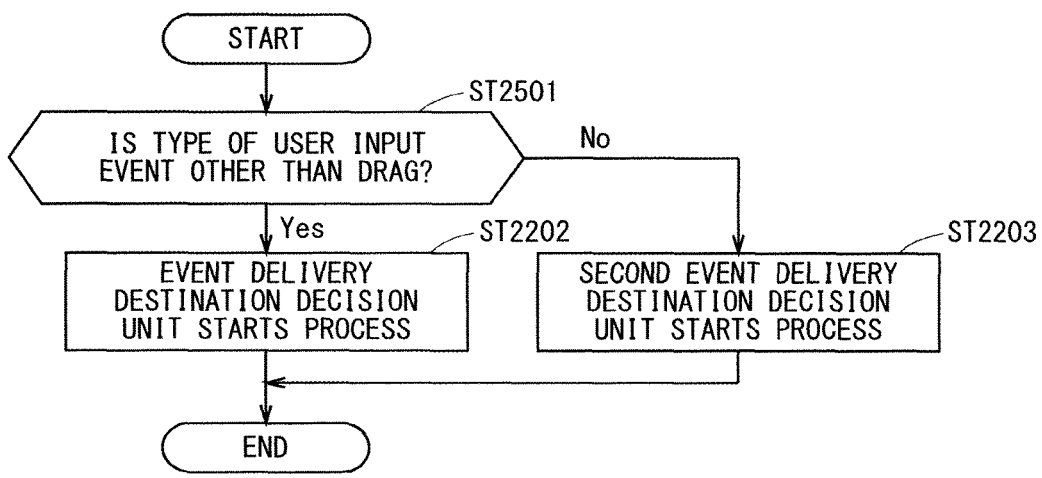
FIG. 25 is a flowchart illustrating a process flow when the type of user input event is drag and a drag event is continuously delivered to the screen layer to which the drag event has been first delivered as long as the drag event continues.

FIG. 25 is a flowchart illustrating the process flow of the event delivery destination decision method switching unit 2101 when the type of user input event is drag and the drag event is continuously delivered to the screen layer to which the drag event has been first delivered as long as the drag event continues.

In FIG. 25, processes denoted with the same reference numerals as in the case of FIG. 22 are processes having the same functions or functions corresponding thereto, and thus descriptions thereof will be omitted.

First, as illustrated in step ST2501, the event delivery destination decision method switching unit 2101 determines whether the type of user input event is other than drag. When the type of user input event is other than drag (Yes), the process proceeds to step ST2202. When the type of user input event is drag (No), the process proceeds to step ST2203.

FIG. 26 is a flowchart illustrating a process flow of an event delivery necessity integration unit 104 when drag starts.

In FIG. 26, processes denoted with the same reference numerals as in the case of FIG. 6 are processes having the same functions or functions corresponding thereto, and thus descriptions thereof will be omitted.

Since the drag may be determined as press or the like when the drag starts, processes in an event delivery necessity concurrent acquisition unit 103 and the event delivery necessity integration unit 104 are first performed.

Then, in step ST2601, the screen layer that is decided as a delivery destination screen layer is stored.

Figure 27:
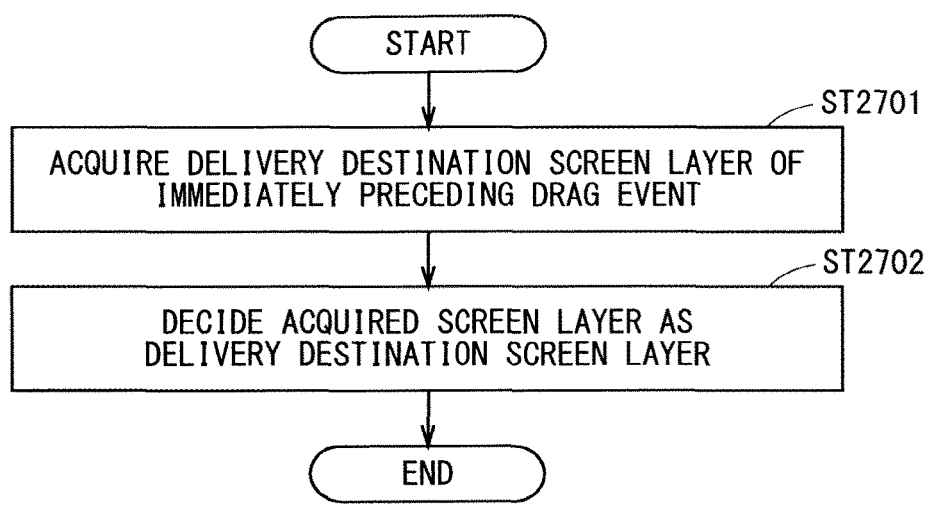
FIG. 27 is a flowchart illustrating a process flow when the type of user input event is drag.

FIG. 27 is a flowchart illustrating a process flow of the second event delivery destination decision unit 2102 when the type of user input event is drag.

First, as illustrated in step ST2701, the second event delivery destination decision unit 2102 acquires the screen layer stored in step ST2601 of FIG. 26.

In step ST2702, the screen layer acquired in step ST2701 is decided as the delivery destination screen layer.

Thus, in the present embodiment, by arbitrarily switching the event delivery destination decision method, even when the event delivery destination decision method described in the first embodiment does not work effectively, it is possible to decide the user input event delivery destination screen layer at a high speed by using another event delivery destination decision method.

<Sixth Embodiment>

Hereinafter, components similar to components described in the above-described embodiments are denoted with the same reference numerals, and detailed descriptions thereof will be omitted as necessary.

In the first embodiment, it is assumed that a user input event is processed in one screen layer, but one user input event may be processed in a plurality of screen layers.

Figure 28:
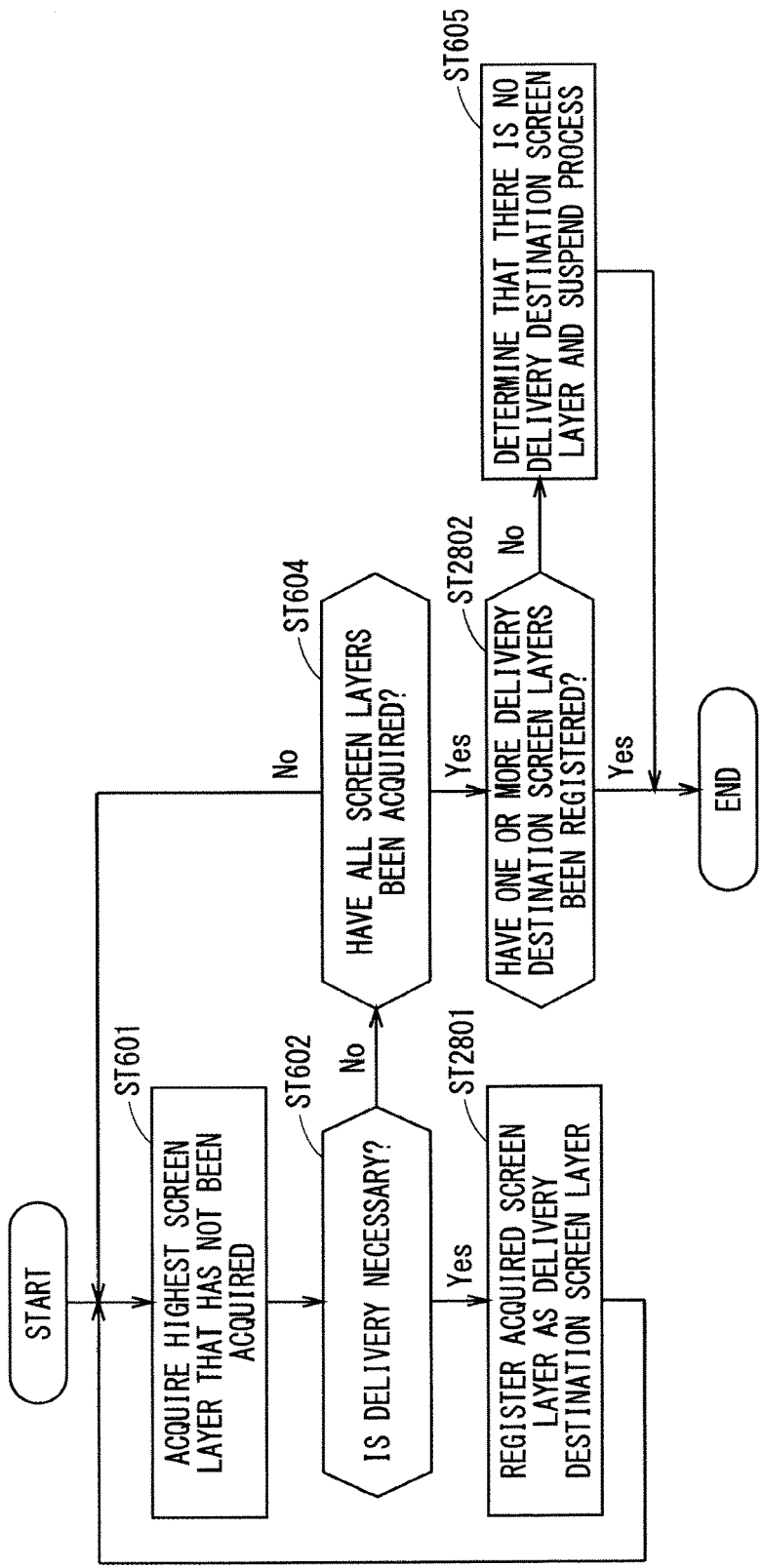
FIG. 28 is a flowchart illustrating a flow of event delivery necessity integration process in the event delivery necessity integration unit.

FIG. 28 is a flowchart illustrating a flow of an event delivery necessity integration process in an event delivery necessity integration unit 104 according to the present embodiment.

In FIG. 28, processes denoted with the same reference numerals as in the case of FIG. 6 are processes having the same functions or functions corresponding thereto, and thus descriptions thereof will be omitted.

In step ST2801, the event delivery necessity integration unit 104 registers the screen layer that requires delivery of the user input event. After that, the process returns to step ST601.

In step S12802, after determination of a confirmation result of event delivery necessity of all the screen layers, the event delivery necessity integration unit 104 determines whether one or more screen layers have been registered as user input event delivery destination screen layers. When one or more screen layers have been registered as user input event delivery destination screen layers (Yes), the process ends. When one or more screen layers have not been registered as user input event delivery destination screen layers (No), the process proceeds to step ST605. An event delivery unit 106 and an event processing unit 109 deliver and process the user input event to all the screen layers registered as user input event delivery destination screen layers, respectively.

Note that in this example, all the screen layers that require the user input event have been registered as user input event delivery destination screen layers, but only some screen layers that require the user input event may be registered as user input event delivery destination screen layers. At that time, any method may be used for selecting the screen layer to be registered as user input event delivery destination screen layer.

<Advantageous Effects>

Effects produced by the above-described embodiments will be illustrated below.

According to the above-described embodiments, the user interface device includes the user input event acquisition unit 102 as an acquisition unit, the event delivery necessity concurrent acquisition unit 103 as a transmission unit, the screen layer management unit 107 as a determination unit, and the event delivery necessity integration unit 104 as a decision unit.

The user input event acquisition unit 102 acquires the user input event as input information from outside. The event delivery necessity concurrent acquisition unit 103 transmits the confirmation request of event delivery necessity as inquiry information inquiring whether the user input event is accepted in each screen layer.

On the basis of the confirmation request of event delivery necessity, the screen layer management unit 107 concurrently determines whether the user input event is information that is accepted in each screen layer for at least two screen layers of the plurality of screen layers.

On the basis of a determination result in the screen layer management unit 107, the event delivery necessity integration unit 104 decides at least one screen layer in which the user input event is accepted.

With such a configuration, even when the screen layers that do not receive the user input event are displayed in an overlapping manner other than the screen layer that should receive the user input event, the screen layer to which the user input event should be delivered can be decided efficiently.

That is, with the above-described configuration, even when many screen layers that should not accept the user input event are displayed in an overlapping manner on the screen layer that should accept the user input event, it becomes possible to efficiently decide the screen layer to which the user input event should be delivered without obstructing change in a position or shape of an object or a position or shape of the screen layer (animation), and furthermore, occupation of a large amount of a storage area. Therefore, it becomes possible to reduce processing time in deciding the delivery destination screen layer of the user input event, leading to an improvement in a screen drawing speed and further improvement in performance of the overall user interface device.

It is to be noted that although components other than these components can be omitted as appropriate, even when arbitrary components described in the present specification are appropriately added, the above-described effect can be produced.

In addition, according to the above-described embodiments, even when the determination result in the screen layer management unit 107 is a determination result regarding part of the screen layers of the plurality of screen layers, the event delivery necessity integration unit 104 decides at least one screen layer in which the user input event is accepted on the basis of the determination result.

With such a configuration, it is possible to reduce the unnecessary confirmation process of event delivery necessity, and it is possible to decide, at a high speed, the screen layer to which the user input event should be delivered.

In addition, according to the above-described embodiments, when the determination result in the screen layer management unit 107 is that the user input event is accepted in at least one screen layer of the plurality of screen layers, and that all determinations have been made regarding the screen layers higher than the screen layers in which the user input event is accepted, the event delivery necessity integration unit 104 decides, on the basis of the determination result, at least one screen layer in which the user input event is accepted.

With such a configuration, it is possible to reduce the unnecessary confirmation process of event delivery necessity, and it is possible to decide, at a high speed, the screen layer to which the user input event should be delivered.

In addition, according to the above-described embodiments, the screen layer management unit 107 concurrently determines whether the user input event is information that is accepted in each screen layer for part of the screen layers of the plurality of screen layers.

With such a configuration, since it is possible to speed up each process and to sequentially perform these processes by limiting the number of confirmation request processes of event delivery necessity to be performed concurrently, it is possible to decide, at a high speed, the user input event delivery destination screen layer, in particular, when the screen layer whose turn to transmit the confirmation request of event delivery necessity comes early needs the user input event.

In addition, according to the above-described embodiments, the screen layer management unit 107 concurrently determines, for all of the plurality of screen layers, whether the user input event is information that is accepted in each screen layer.

With such a configuration, even when many screen layers that should not accept the user input event are displayed in an overlapping manner on the screen layer that should accept the user input event, it becomes possible to efficiently decide the screen layer to which the user input event should be delivered without obstructing change in a position or shape of an object or a position or shape of the screen layer (animation), and furthermore, occupation of a large amount of a storage area. Therefore, it becomes possible to reduce processing time in deciding the delivery destination screen layer of the user input event, leading to an improvement in a screen drawing speed and further improvement in performance of the overall user interface device.

In addition, according to the above-described embodiments, the screen layer management unit 107 decides the number of screen layers in which determination is concurrently made whether the user input event is information that is accepted in each screen layer in accordance with a processing speed in the screen layer management unit 107.

With such a configuration, the confirmation process of necessity of the user input event can be performed while taking the processing speed in the processing device 202 into consideration and taking full advantage of processing capability of the processing device 202.

In addition, according to the above-described embodiments, the screen layer management unit 107 decides the number of screen layers in which determination is concurrently made whether the user input event is information that is accepted in each screen layer in accordance with the number of CPUs that can be used in the screen layer management unit 107.

With such a configuration, it also becomes possible to automatically acquire the maximum number of screen layers the processing device 202 can process concurrently from the number of CPUs in the processing device 202, and thus the delivery destination screen layer of the user input event can be decided efficiently.

In addition, it also becomes possible to automatically acquire the number of screen layers that can be processed concurrently and fluctuates depending on an operation state of the processing device 202, from the number of CPUs that can be used for the determination in the processing device 202, that is, the number of CPUs that are not performing any processes or have low usage rate, and thus the delivery destination screen layer of the user input event can be decided efficiently.

In addition, according to the above-described embodiments, when transmitting the confirmation request of event delivery necessity, the event delivery necessity concurrent acquisition unit 103 transmits the confirmation request of event delivery necessity corresponding to each screen layer in order according to priority determined in advance for each screen layer.

With such a configuration, it becomes possible to early perform leveling out of the process assigned to each core of the processing device 202, or the confirmation process of event delivery necessity of the screen layer that is likely to receive the user input event. Therefore, it is possible to decide the delivery destination screen layer of the user input event at a high speed.

In addition, according to the above-described embodiments, the priority of each screen layer is decided in accordance with the type of user input event.

With such a configuration, it is possible to set the priority in accordance with the type of user input event.

In addition, according to the above-described embodiments, the priority of each screen layer is decided in accordance with acceptance limitation of the user input event in the user input event acquisition unit 102.

With such a configuration, it is possible to set the priority depending on preparations to accept the user input event in the user input event acquisition unit 102.

In addition, according to the above-described embodiments, the priority of each screen layer is decided in accordance with a connection state with an external device.

With such a configuration, it is possible to set the priority depending on the connection state of the user interface device with the external device.

In addition, according to the above-described embodiments, when a predetermined switching condition is satisfied, the screen layer management unit 107 sequentially determines for each screen layer whether the user input event is information that is accepted in each screen layer.

With such a configuration, even when effects are not expected by a certain method for deciding the event delivery destination, it is possible to switch to another method for deciding the event delivery destination, and it is possible to always decide the delivery destination screen layer of the user input event at a high speed.

In addition, according to the above-described embodiments, the switching condition is a condition regarding the number of screen layers the screen layer management unit 107 needs to determine.

With such a configuration, it is possible to switch the method for deciding the event delivery destination on the basis of the number of screen layers that require confirmation of event delivery necessity.

In addition, according to the above-described embodiments, the switching condition is a condition regarding the number of CPUs that can be used for determination in the screen layer management unit 107.

With such a configuration, it is possible to switch the method for deciding the event delivery destination on the basis of the number of cores (the number of CPUs) in the processing device 202.

In addition, according to the above-described embodiments, the switching condition is a condition to be decided in accordance with a type of user input event.

With such a configuration, it is possible to switch the method for deciding the event delivery destination in accordance with the acquired type of user input event.

In addition, according to the above-described embodiments, the event delivery necessity integration unit 104 decides the plurality of screen layers in which the user input event is accepted on the basis of the determination result in the screen layer management unit 107.

With such a configuration, even when one user input event is processed in a plurality of screen layers, it is possible to decide the delivery destination screen layer of the user input event at a high speed.

In addition, according to the above-described embodiments, a method for displaying a user interface is a method for transmitting a confirmation request of event delivery necessity inquiring whether a user input event from outside is accepted in each screen layer, determining concurrently whether the user input event is information that is accepted in each screen layer for at least two screen layers of a plurality of screen layers on the basis of the confirmation request of event delivery necessity, and deciding at least one screen layer in which the user input event is accepted, on the basis of a determination result.

With such a configuration, even when the screen layers that do not receive the user input event are displayed in an overlapping manner other than the screen layer that should receive the user input event, the screen layer to which the user input event should be delivered can be decided efficiently.

That is, with the above-described configuration, even when many screen layers that should not accept the user input event are displayed in an overlapping manner on the screen layer that should accept the user input event, it becomes possible to efficiently decide the screen layer to which the user input event should be delivered without obstructing change in a position or shape of an object or a position or shape of the screen layer (animation), and furthermore, occupation of a large amount of a storage area. Therefore, it becomes possible to reduce processing time in deciding the delivery destination screen layer of the user input event, leading to an improvement in a screen drawing speed and further improvement in performance of the overall user interface device.

<Variations>

In the above-described embodiments, dimensions, shapes, relative positional relationships, or conditions of implementation of respective components have been described in some cases, but these are illustration in all aspects and are not limited to the descriptions in this specification. Therefore, countless variations that are not illustrated are considered within the scope of the present technology. For example, modification, addition, or omission of an arbitrary component, and furthermore, extraction of at least one component in at least one embodiment and combination with a component of another embodiment are included.

In addition, as long as no contradiction arises, a component described as "one" component being provided in the above-described embodiments may be "one or more" components provided. Furthermore, each component is a conceptual unit, and includes a case of one component including a plurality of structures, a case of one component corresponding to part of a certain structure, and moreover, a case of one structure provided with a plurality of components. In addition, each component includes a structure having another structure or shape as long as the component exerts the same function.

In addition, the descriptions in this specification are referenced for all objects of the present technology, neither of which is deemed to be prior art.

An operation performed by each component described in the above-described embodiments can be implemented with at least one processing circuit or electric circuit. The processing circuit and the electric circuit include a programmed arithmetic processing unit, and in this case, the operation performed by each component described in the above-described embodiments is implemented by the processing circuit or the electric circuit operating according to the preset program. In addition, the program for implementing the operation to be performed by each component is stored in a storage medium such as a hard disk or a memory. In addition, the processing circuit includes an integrated circuit (application specific integrated circuit, that is, ASIC) or a conventional circuit element that is modified to implement the operations described in the above-described embodiments.

The present technology may be a case where respective components are provided in a plurality of devices in a distributed manner (that is, in such an aspect as a system). For example, the present technology may be a case where a computer and a display in the user interface device are provided in a distributed manner, and display control is performed on the display from outside using the computer.

REFERENCE SIGNS LIST

101: input device
102: user input event acquisition unit
103: event delivery necessity concurrent acquisition unit
104: event delivery necessity integration unit
105: event delivery destination decision unit
106: event delivery unit
107: screen layer management unit
108: in-screen layer information storage unit
109: event processing unit
110: drawing control unit
111: display device
201: computer
202: processing device
203: storage device
204: display
205: mouse
206: keyboard
701,702,703: screen layer
1001: concurrent acquisition number storage unit
1002: acquisition unit
1003: transmission unit
1004: decision unit
1007: determination unit
1501: priority storage unit
2101: event delivery destination decision method switching unit
2102: second event delivery destination decision unit

The invention claimed is:

1. A user interface device for superimposing at least part of a plurality of screen layers for display on a screen, the user interface device comprising:
    a processor to execute a program; and
    a memory to store the program which, when executed by the processor, performs processes of,
        acquiring input information from outside,
        transmitting inquiry information inquiring whether the input information is accepted in each of the plurality of screen layers,
        determining, concurrently for each of the plurality of screen layers displayed on the screen, whether the input information is information that is accepted in each of the plurality of screen layers, based on the inquiry information, and
        checking, sequentially in order from a highest screen layer out of the plurality of screen layers, whether each of the plurality of screen layers is the screen layer in which the input information is accepted based on a determination result, and deciding, when finding that the screen layer concerned is the screen layer in which the input information is accepted, that the screen layer concerned is one of the plurality of screen layers in which the input information is accepted.

2. The user interface device according to claim 1, wherein even when the determination result is a determination result regarding part of the plurality of screen layers, the program, when executed by the processor, further performs a process of deciding, based on the determination result, one of the screen layers in which the input information is accepted.

3. The user interface device according to claim 2, wherein when the determination result is a determination result that the input information is accepted in at least one of the plurality of screen layers, and that all determinations have been made regarding the screen layers higher than the screen layers in which the input information is accepted, the program, when executed by the processor, further performs a process of deciding, based on the determination result, one of the screen layers in which the input information is accepted.

4. The user interface device according to claim 1, wherein the program, when executed by the processor, further performs a process of determining, concurrently for part of the plurality of screen layers, whether the input information is information that is accepted in each of the screen layers.

5. The user interface device according to claim 1, wherein when transmitting the inquiry information, the program, when executed by the processor, further performs a process of transmitting the inquiry information corresponding to each of the screen layers in order according to priority determined in advance for each of the screen layers.

6. The user interface device according to claim 1, wherein the program, when executed by the processor, further performs processes of determining, concurrently for part of the plurality of screen layers, whether the input information is information that is accepted in each of the screen layers, and
deciding, in accordance with a processing speed in the processor, the number of the screen layers in which determination is concurrently made whether the input information is information that is accepted in each of the screen layers.

7. The user interface device according to claim 1, wherein the program, when executed by the processor, further performs processes of determining, concurrently for part of the plurality of screen layers, whether the input information is information that is accepted in each of the screen layers, and
deciding, in accordance with a number of CPUs used in the processor, the number of the screen layers in which determination is concurrently made whether the input information is information that is accepted in each of the screen layers.

8. A user interface device for superimposing at least part of a plurality of screen layers for display on a screen, the user interface device comprising:
    a processor to execute a program; and
    a memory to store the program which, when executed by the processor, performs the processes of,
        acquiring input information from outside, transmitting inquiry information inquiring whether the input information is accepted in each of the screen layers, determining, concurrently for each of the plurality of screen layers displayed on the screen, whether the input information is information that is accepted in each of the plurality of screen layers, based on the inquiry information, and deciding at least one of the plurality of screen layers in which the input information is accepted, based on a determination result, wherein when a predetermined switching condition is satisfied, the program, when executed by the processor, further performs a process of sequentially determining, for each of the plurality of screen layers, whether the input information is information that is accepted in each of the plurality of screen layers.

9. The user interface device according to claim 8, wherein the switching condition is a condition regarding the number of the screen layers that needs to be determined.

10. The user interface device according to claim 8, wherein the switching condition is a condition regarding a number of CPUs to be used for determination.

11. The user interface device according to claim 8, wherein the switching condition is a condition to be decided in accordance with a type of the input information.

12. A method for displaying a user interface for superimposing at least part of a plurality of screen layers for display on a screen, the method comprising:

transmitting inquiry information inquiring whether input formation from outside is accepted in each of the plurality of screen layers;

determining, concurrently for each of the plurality of screen layers displayed on the screen, whether the input information is information that is accepted in each of the plurality of screen layers, based on the inquiry information; and checking, sequentially in order from a highest screen layer out of the plurality of screen layers, whether each of the plurality of screen layers is the screen layer in which the input information is accepted, based on a result of the determination, and deciding, when finding that the screen layer concerned is the screen layer in which the input information is accepted, that the screen layer concerned is one of the plurality of screen layers in which the input information is accepted.

* * * * *